United States Patent [19]  
Han et al.

[11] Patent Number: 4,900,782  
[45] Date of Patent: Feb. 13, 1990

[54] STABILIZED POLYELECTROLYTE PRECURSORS OF POLY(AROMATIC AND HETEROAROMATIC VINYLENES)

[75] Inventors: Chien-Chung Han, Madison; Kwan-Yue A. Jen, Succasunna; Ronald L. Elsenbaumer, Morris Twsp., Morris County, all of N.J.

[73] Assignee: Allied-Signal Inc., Morris Township, Morris County, N.J.

[21] Appl. No.: 177,247

[22] Filed: Apr. 4, 1988

[51] Int. Cl.$^4$ .................... C08G 61/02; C08F 283/06
[52] U.S. Cl. .................... 525/398; 525/400; 525/401; 524/174
[58] Field of Search .................. 524/17, 80, 81, 174, 524/401, 609; 525/398, 400, 401; 528/232, 242, 246, 251

[56] References Cited

U.S. PATENT DOCUMENTS 4,808,681 2/1989 Harper et al. .

FOREIGN PATENT DOCUMENTS 0182548 5/1986 European Pat. Off. .

OTHER PUBLICATIONS

Kwan-Yue Jen, et al. "Poly(2,5-Thienylene, Vinylene) Prepared via a Soluble Precursor Polymer", *J. Chem. Soc., Chem. Commun.* p. 309 (1987).

Primary Examiner—John Kight  
Assistant Examiner—Carlos Azpuru  
Attorney, Agent, or Firm—Richard C. Stewart; Gerhard H. Fuchs

[57] ABSTRACT

This invention relates to novel forms of poly(heteroaromatic vinylenes), and poly(aromatic vinylenes) and to solutions thereof, either in the conductive form or non-conductive form.

24 Claims, No Drawings

STABILIZED POLYELECTROLYTE PRECURSORS OF POLY(AROMATIC AND HETEROAROMATIC VINYLENES)

BACKGROUND OF THE INVENTION

1. Field of the Invention

This invention relates to novel forms of poly(heteroaromatic vinylenes), and poly(aromatic vinylenes) and to solutions thereof, either in the conductive form or non-conductive form. Another aspect of this invention relates to a method of using the solution of this invention to form conducting polymer articles, including films, fibers, and coatings and methods of using such solutions as conducting liquids. Yet another aspect of this invention relates to novel process for preparing the poly(heteroaromatic vinylenes) and poly(aromatic vinylenes) of this invention.

2. Prior Art

There has recently been an increased interest in the electrical conductivity of polymeric systems. For example, U.S. Pat. Nos. 4,321,114 and 4,442,187 are directed to conjugated polymers having conjugation in all or a part of at least one backbone chain thereof, such as polyacetylene, polyphenylene, and poly(phenylene sulfide). It has recently been discovered that these conjugated backbone polymers can be chemically doped in a controlled manner with electron acceptor and/or electron donor dopants to produce electrically conducting polymers. Doping procedures and certain representative doped polymers are described in U.S. Pat. Nos. 4,222,903 and 4,204,216.

In the general field of conducting polymers, it is believed very difficult to dope one of these conjugated backbone polymers to the extent that it becomes a good conductor ($10^{-3}$–100 ohm$^{-1}$cm$^{-1}$) and thereafter dissolve the polymer in any solvent-system. U.S. Pat. Nos. 4,452,727 and 4,599,194 disclose novel polymer solutions containing a doped sulfur-containing or oxygen-containing aromatic polymer. The solvent of this solution is restricted to solvents containing Lewis Acid halides having a liquid phase under atmospheric pressure for at least one temperature between $-150°$ C. and $+100°$ C., such as arsenic trifluoride, phosphorus trifluoride, phosphorous pentafluoride, phosphorus trichloride, boron trifluoride and the like. These solutions can be used to form articles, as for example, by casting the solution onto a substrate, and removing the solvent. This solution and method represents a significant advancement over the art; however, it does suffer from certain economic and practical disadvantages resulting from the cost and high environmental reactivity and toxicity of the specific solvents which must be used.

A few conductive species of polyalkylthiophenes are known, having been primarily prepared by electrochemical polymerization. Illustrative of such species are poly(3-methylthiophene) and poly(3,4-dimethylthiophene). R. J Bargon, and A. F. Diaz, *J. Phys. Chem.*, 1983, 87, 1459–1463. G. Tourillon, D. Govrier, P. Garnier, and D. Viven, *J. Phys. Chem.*, 1984 88, 1049–1051. S. Hotta, T. Hosaka, and W. Shimotsuma, *Syn. Metals.* 1983, 6, 317–318. However, the polymers prepared electrochemically are not soluble in common organic solvents such as acetonitrile, propylene carbonate, tetrahydrofuran, dichloromethane, dimethyl formamide, nitrobenzene, nitropropane, toluene, and the like. In the absence of solutions, or plasticized forms, the ability to economically fabricate articles out of the conducting forms of these poly(alkylthiophenes), especially semiconducting and conducting polymer films, fibers, and coatings, especially using conventional solvents or melt-forming techniques, is greatly restricted. In fact, the electrochemical methods are reported to give homogeneous conductive polymer films only up to film thickness of about 2000 Å. Powdery deposits are obtained when attempts are made to grow films thicker than this. (G. Tourillon and F. Garnier, *J. Poly. Sci. Poly. Phys. Ed.*, 1984, 22, 33–39.)

The unsubstituted polythiophenes form highly conductive complexes on doping which are not stable in normal environments (containing air or water vapor). However, electrochemically prepared conductive poly(3-methylthiophene) is environmentally stable. (G. Tourillon and F. Garnier, *J. Electrochem. Soc., Electrochem. Sci, Techn.* 1983, 130, 2042–3.

A few conductive oligomeric species of poly(thiophene vinylenes), i.e., 6 to 8 repeat units, are known. For example, such materials are described in Kossmehl, G. et al., *Makromol Chem.*, V. 131, pp. 15–54 (1970), and Kossmehl G., *Ber. Bunsenges Phys. Chem.*, 83, pp. 417–426 (1979). These oligomeric species of poly(thiophene vinylenes) exhibit several undesirable properties, which limit their utility in potential applications such as EMI shielding, and as anti-static materials. For example, the above-cited publications disclose that these oligomeric poly(thiophene vinylenes) are insoluble in common organic solvents which essentially precludes solution processability, are infuseable which essentially precludes melt processability, and exhibit low conductivities ($10^{-12}$–$10^{-2}$ ohm$^{-1}$cm$^{-1}$) which essentially precludes use of such materials in EMI shielding and circuitry applications.

Kwan-Yue Jen, et al "Poly(2,5-Thienylene, Vinylene) Prepared Via a Soluble Precursor Polymer" *J. Chem. Soc., Chem. Commun.* p. 309 (1987) describes the preparation of poly(2,5-thienylene vinylenes) from various water soluble polyelectrolytes precursor polymers containing pendant sulfonium groups. The elimination of these groups results in the formation of conjugated unsaturation in the polymeric backbone. While this procedure represents a significant advance in the art, it suffers from some disadvantages. For example, with the heteroarylene series, the sulfonium precursor polyelectrolytes are very thermally sensitive. Elimination of the sulfonium groups generally occurs at temperatures between 0° C. and 60° C. making it difficult to fabricate the precursor polymer under ambient (room temperature) conditions. There is a need to find methods to stabilize the precursor polymers so that they can be handled and fabricated by typical processing techiques at ambient and elevated temperatures.

Further, with the arylene vinylene series, particularly substituted arylene vinylenes, the precursor sulfonium salt polyelectrolytes tend to readily form viscous gels which are not free flowing and difficult to fabricate. Thus, there is also a need for developing stable, non-gel forming solutions of these polyelectrolyte precursors to facilitate their fabrication in to films, fibers and coatings by solution processing techniques.

SUMMARY OF THE INVENTION

One embodiment of this invention relates to soluble and processible precursor homopolymers or random or block copolymers which are useful in the formation of poly(heterocyclic vinylenes), said polymers having regular or random recurring units of the Formulas I to VII;

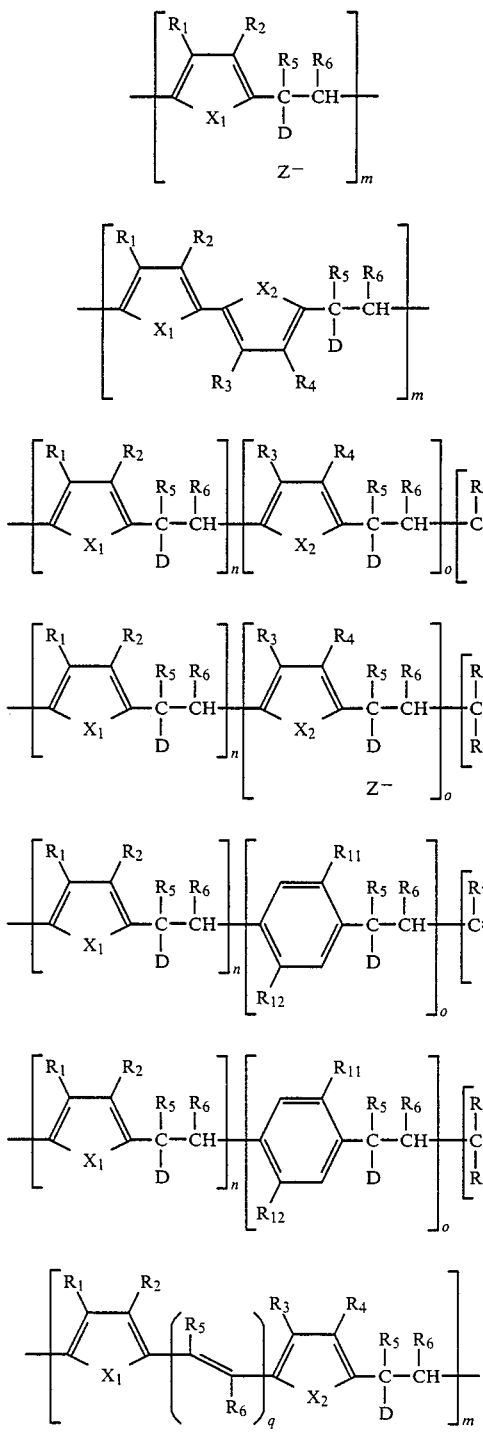

wherein;

m, n, o and p are the same or different and are selected such that m, or the sum of n, o and p is greater than about 100, with the proviso that at least one of n or o is not zero;

q is an integer which can range from 0 to about 4;

D is a leaving group such as a moiety of the formula —OR$_1$, —SCOOR$_1$, —SCSOR$_1$, —SOR$_1$, —SR$_1$, —O-SO$_2$R$_1$, —OOR$_1$, —OSO$_3$R$_1$, —+NR$_1$R$_2$R$_3$.Z$^-$, —P+R$_1$R$_2$R$_3$.Z$^-$, —SeR$_1$, —F, —P(OR$_1$)$_2$, —SiR$_1$R$_2$R$_3$, —+R$_1$R$_2$.Z$^-$, —+NOR$_2$Z.$^-$, —PO(OR$_1$)(OR$_2$), —SO$_3$$^-$M$^+$, —Cl, —Br, —I, —CN, —N$_3$ and the like;

Z$^-$ is an anion such as BF$_4$, NO$_3$$^-$, F$^-$, Cl$^-$, Br$^-$, I$^-$, ClO$_4$$^-$, CF$_3$CO$_2$$^-$, ClO$_3$$^-$, MoCl$_6$$^-$, MoOCl$_4$$^-$, FeCl$_2$$^-$, AlCl$_4$$^-$, CH$_3$CH$_2$SO$_3$$^-$, KS$_2$O$_8$$^-$, BF$_4$$^-$, PF$_6$$^-$, SbF$_6$$^-$, NO$_2$$^-$, HSO$_4$$^-$, ClO$_2$$^-$, H$_2$PO$_4$$^-$, HSO$_3$$^-$, NaSO$_3$$^-$, CF$_3$SO$_3$$^-$, CH$_3$SO$_3$$^-$, CH$_3$CO$_2$$^-$, CH$_3$C$_6$H$_4$SO$_3$$^-$ and the like;

R$_1$, R$_2$, R$_3$, R$_4$, R$_5$, R$_6$, R$_7$, R$_8$, R$_9$, R$_{10}$, R$_{11}$, and R$_{12}$ are the same or different at each occurence and are hydrogen or isotopes thereof, alkyl, alkenyl, aryl, alkoxy, cycloalkyl, cycloalkenyl, alkanoyl, alkylthio, aryloxy, alkylthioalkyl, alkynyl, alkylaryl, arylalkyl, amido, alkylsulfinyl, alkoxyalkyl, alkylsulfonyl, aryl, arylamino, diarylamino, alkylamino, dialkylamino, phosphoric acid, alkylarylamino, arylthio, heteroaryl, arylsulfinyl, alkoxycarbonyl, arylsulfonyl, carboxylic acid, halogen, nitro, cyano, sulfonic acid, or alkyl or phenyl substituted with one or more of sulfonic acid, phosphoric acid, carboxylic acid, halo, amino, nitro, cyano or epoxy moieties, or a moiety of the formula;

(OR$_{13}$)$_r$OR$_{14}$ or —OR$_{13}$—(OR$_{13}$)$_r$OR$_{14}$ wherein;

R$_{13}$ is a divalent alkylene moiety having from 1 to about 7 carbon atoms;

R$_{14}$ is alkyl having from 1 to about 7 carbon atoms; and r is a natural number from 1 to about 50; or and R$_1$ and R$_2$, or R$_3$ and R$_4$, or R$_5$ and R$_6$, or R$_7$ and R$_8$, or R$_9$ and R$_{10}$, or R$_{11}$ and R$_{12}$, or R$_{13}$ and R$_{14}$ substituents taken together are an alkylene or alkenylene group completing a 3, 4, 5, 6 or 7 membered aromatic or alicyclic carbon ring, which ring may optionally include one or more divalent heteroatoms of nitrogen, sulfur, sulfinyl, sulfonyl or oxygen; and X$_1$ and X$_2$ are the same or different and are S, O, Se, NR$_{15}$, or PR$_{15}$, wherein R$_{15}$ is hydrogen, alkylaryl, arylalkyl, alkyl or aryl, or R$_1$;

This invention also relates to solutions of the polymers of Formulas I to VII in protic or aprotic solvents. These solutions can be used to form films of the polymers of Formula I to VII, which upon subsequent treatment such as heat treatment and treatment with base or other chemical agents eliminates DH to form the corresponding conjugated random or block copolymers and homopolymers having regular or random recurring conjugated units of the following Formulas VIII to XIV;

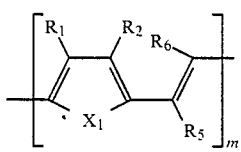

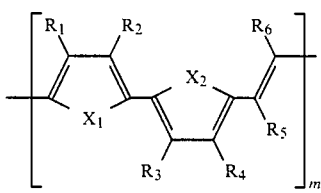

-continued

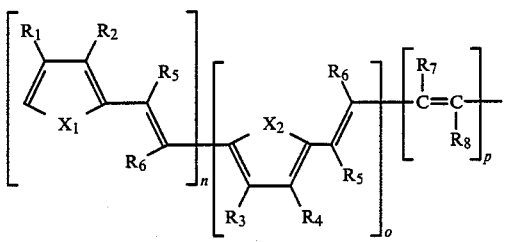  X

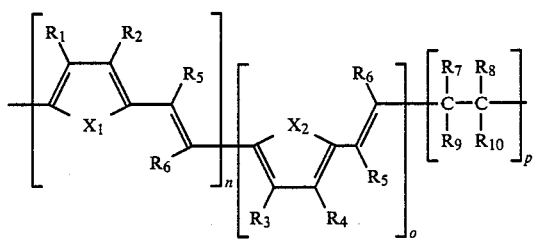  XI

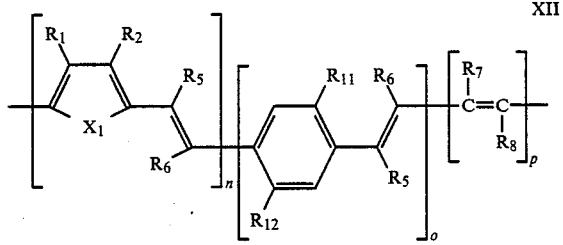  XII

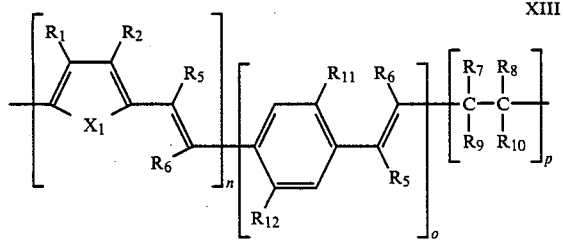  XIII

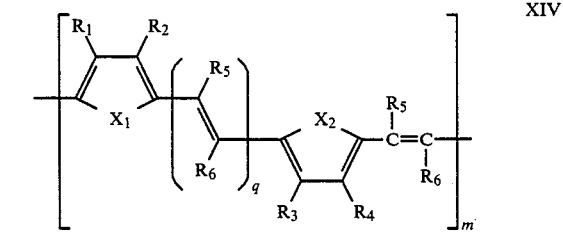  XIV wherein m, n, o, p, q, $X_1$, $X_2$, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$ and $R_{15}$ are as described above.

Another aspect of this invention relates to a solution which comprises;

(a) an aqueous or organic solvent; and
(b) one or more forms of the copolymers and homopolymers of Formulas I, II, III, IV, V, VI, and VII, VIII, IX, X, XI, XII, XIII and XIV.

Solutions of Formulas I to VII can be conveniently used to form conductive articles by first removing the solvent, then inducing elimination of DH, thereby producing polymers of Formulas VIII to XIV (neutral, undoped) which, through the use of an electron-acceptor or donor dopant, form an electrically conductive article. The use of the solutions of this invention in the methods of this invention provides conductive articles and composites of all shapes, as for example, films and fibers which are air stable, free standing and flexible.

Another aspect of this invention relates to melt-processing of polymers of the Formulas I to XIV and blends of these polymers and conventional thermoplastic polymers, i.e., polyolefins, polyesters, polyamides, and the like formed by melt processing which are useful of forming conductive articles.

DETAILED DESCRIPTION OF THE INVENTION

One aspect of this invention is a homopolymer or a random or block copolymer according to Formula I to VII, wherein o, q, p, n, m, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $Z^-$, D, $X_1$ and $X_2$ are as described above.

Illustrative of useful $R_1$, $R_2$, $R_3$, $R_4$, $R_5$, $R_6$, $R_7$, $R_8$, $R_9$, $R_{10}$, $R_{11}$, and $R_{12}$ groups are hydrogen; cyano; nitro; halo; alkyl such as methyl, ethyl, butyl, pentyl, hexyl, octyl, nonyl, tert-butyl, neopentyl, isopropyl, sec-butyl, dodecyl and the like, alkenyl such as 1-propenyl, 4-butenyl, 1-pentenyl, 6-hexenyl, 1-heptenyl, 8-octenyl and the like; alkoxy such as propoxy, butoxy, methoxy, isopropoxy, pentoxy, nonyloxy, ethoxy, octyloxy, and the like; cycloalkenyl such as cyclohexenyl, cyclopentenyl and the like; alkanoyl such as butanoyl, pentanoyl, octanoyl, ethanoyl, propanoyl and the like; arylamino and diarylamino such as phenylamino, diphenylamino and the like; alkylsulfinyl, alkylsulfonyl, alkylthio, arylsulfonyl, arylthio, and the like, such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; alkyl amino and dialkylamino such as dimethylamino, methylamino, diethylamino, ethylamino, dibutylamino, butylamino and the like; cycloalkyl such as cyclohexyl, cyclopentyl, cyclooctyl, cycloheptanyl and the like; alkoxyalkyl such as methoxymethylene, methoxyethoxyethylene, methoxydiethoxyethylene, ethoxymethylene, butoxymethylene, propoxyethylene, pentoxybutylene and the like; arylalkylamino such as methylphenylamino, ethylphenylamino and the like; aryloxyalkyl and aryloxyaryl such as phenoxyphenylene, phenoxymethylene and the like; and various substituted alkyl and aryl groups such as 1-hydroxybutyl, 1-aminobutyl, 1-hydroxylpropyl, 1-hydroxypentyl, 1-hydroxyoctyl, 1-hydroxyethyl, 2-nitroethyl, trifluoromethyl, 3,4-epoxy-butyl, cyanomethyl, 3-chloropropyl, 4-nitrophenyl,3-cyanophenyl, 1-hydroxy- methyl, and the like; sulfonic acid terminated alkyl and aryl groups; carboxylic acid and phosphoric acid terminated alkyl and aryl groups such as ethylsulfonic acid, propylsulfonic acid, butylsulfonic acid, phenylsulfonic acid, and the corresponding carboxylic acids. Exemplary of other useful $R_1$ to $R_{12}$ groups are moieties of the formula;

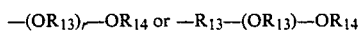

where r, —$R_{13}$— and —$R_{14}$ are as described above. Useful $R_{13}$ groups include divalent moieties of the formulas —$(CH_2)_2$—, —$(CH_2)_3$—, —$(CH_2)_4$— and —$(CH_2CH(CH_3))$—, and useful $R_{14}$ groups include —CH₃, and —CH₂CH₃. Illustrative of substituents having such $R_{13}$ and $R_{14}$ are ethyleneglycol monomethylether, diethylene glycol monomethylether, triethylene glycol monomethylether, tetraethylene glycol monomethylether, and the like.

Illustrative of useful D groups are moieties of the formula;

(a) —OR₁, —P(OR₁)₂, —SR₁, —SeR₁, —SC(S)OR₁ or —SOR₁ where R₁ is as described above, as for example, hydrogen; alkoxyalkyl, such as methoxymethyl, ethoxymethyl, and the like; alkyl such as methyl, ethyl, propyl, and butyl; aryl and alkylaryl such as phenyl, tolyl and the like; arylalkyl such as benzyl, phenethyl, 4-phenyl-butyl and the like; alkanoyl and aroyl such as acetyl, butanoyl, benzoyl, and the like; alkanesulfonyl and arylsulfonyl such as methenesulfonyl, ethanesulfonyl, butanesulfonyl, toluenesulfonyl, phenylsulfonyl, and the like; and alkyl or aryl group substituted with carboxylic or sulfonic acid groups or salts thereof such as butylsulfonic acid, butylcarboxylic acid, pentyl sulfonic acid; pentyl carboxylic acid, propane sodium sulfonate, pentane sodium sulfonate, and the like;

(b) —PO(OR₁)(OR₂), ⁺SOR₁R₂Z⁻, —N—R₁R₂Z⁻, where R₁ and R₂ are as described above, as for example, alkyl, such as methyl, ethyl, propyl, butyl and the like; alkylaryl, alkoxyaryl, and aryl such as phenyl, tolyl, anisyl, and the like; arylalkyl such as benzyl, phenethyl, 4-phenylbutyl, and the like; or R₁ and R₂ together may form an alkenylene or alkylene chain such as —(CH₂)₄—, —(CH₂)₃—, —(CH₂)₇—, —(CH₂)₅—, —(CH₂)₆—, —CH=CH—CH₂—, —CH₂—S—CH₂—, and —CH₂—O—CH₂—, —CH₂NH—CH₂—, and the like or an alkenylene chain having one or more unsaturated completing a saturated ring or an aromatic or heterocyclic ring structure; or R₁ and R₂ together may form aryl structures of the formula;

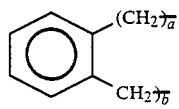

wherein a and b are the same or different and are integers from about 0 to 3;

(c) —N⁺R₁R₂R₃.Z⁻, —P⁺R₁R₂R₃.Z, and —SiR₁R₂R₃, where R₁, R₂, and R₃ are the same or different at each occurrence and are hydrogen, alkyl such as methyl, ethyl, propyl, butyl, and the like; arylalkyl such as benzyl, phenethyl, 4-phenylbutyl and the like; aryl, alkylaryl, and alkoxyaryl, such as phenyl, tolyl, anisyl and the like; or any two or three of R₁, R₂ and R₃ together form a alkylene or alkenylene chain containing one or more unsaturated moieties, wherein such chain may optionally complete a saturated cyclic, or an aromatic or heterocyclic ring, as for example, pyridinium;

(d) halogen, such as F, Cl, Br, and I;

(e) pseudohalogens, such as —CN, —OCN, —SCN, —N₃ and the like; and (f) —SO₃⁻M⁺ wherein M⁺ is hydrogen or alkali metal ion such as lithium, sodium or potassium.

The nature of Z⁻ groups is not critical and Z⁻ can be any anion. Illustrative of useful Z⁻ groups are anions such as BF₄⁻, NO₃⁻, F⁻, Cl⁻, Br⁻, I⁻, ClO₄⁻, Cl₄, CF₃CO₂⁻, MoCl₆⁻, FeCl₂⁻, AlCl₄⁻, BF₄⁻, NO₂⁻, HSO₄⁻, ClO₃, NFeCl₄⁻, CF₃CO₂⁻, ClO₃⁻, MoCl₆⁻, MoOCl₄⁻, FeCl₂⁻, AlCl₄⁻, CH₃CH₂SO₃⁻, KS₂O₈⁻, BF₄⁻, PF₆⁻, SbF₆⁻, NO₂⁻, HSO₄⁻, FeCl₄⁻, H₂PO₄⁻, ClO₂⁻, ClO⁻, HSO₃⁻, NaSO₃⁻, CF₃SO₃⁻, CH₃SO⁻, CH₃CO₂⁻, CH₃C₆H₄SO₃⁻, SCN⁻, OCN⁻, CN⁻, and the like.

Preferred for use in the practice of this invention are homopolymers, and random or block copolymers of the above Formulas I to VII in which;

m, n, o and p are the same or different and are selected such that m, or the sum of n, o and p is an integer at least about 100, with the proviso that at least one of n or o is greater than zero; preferably that the sum of n, o and p, or m is at least about 300;

q is an integer from 0 to about 4;

R₁, R₂, R₃ and R₄ are the same or different at each occurrence and are hydrogen or alkyl having from 1 to about 20 carbon atoms, such as ethyl, propyl, isopropyl, n-butyl, sec-butyl, isobutyl, n-pentyl, isopentyl, secpentyl, tert-pentyl, n-hexyl, n-octyl, n-nonyl, n-decyl, and n-dodecyl; phenyl; alkylphenyl such as 2,4-dimethylphenyl, 4-methylphenyl, 4-ethylphenyl, and 4-butylphenyl; phenylalkyl such as benzyl, phenethyl; alkoxy having from 1 to about 12 carbon atoms such as methoxy, ethoxy, and butoxy; alkanoyl having from 1 to 20 carbon atoms such as formyl, acetyl, and propinyl; alkylthio having from 1 to 20 carbon atoms such as methylthio, ethylthio, propylthio, dodecylthio and butylthio; alkoxyalkyl having from 1 to 20 carbon atoms such as methoxy methyl, ethoxy ethyl, heptoxy propyl, methoxy ethyl, alkenyl having from 1 to about 20 carbon atoms such as allyl, vinyl and 3-butenyl; or phenyl and alkyl substituted with epoxy, sulfonic acid, nitro, cyano, phosphoric acid, carboxylic acid, or halo substituents such as trifluoromethyl, 3,4-epoxybutyl, cyanomethyl, 2-nitroethyl, 3-chloropropyl, 4-nitrophenyl, —CH₂CH₂CH₂SO₃H; —CH₂CH₂CH₂P(O)(OH)₂; and —CH₂CH₂CH₂CO₂H; moiety of the formula;

—(OR₁₃)ᵣ—OR₁₄ or —R₁₃—(OR₁₃)ᵣ—OR₁₄ wherein

R₁₃ is alkyl having from 1 to about 4 carbon atoms;

R₁₄ is alkyl having from 1 to about 4 carbon atoms; and r is a natural number from 1 to about 25 such as ethylene glycol monomethylether, diethylene glycol monomethylether, triethylene glycol monomethylether, tetraethylene glycol monomethylether and the like; or any of R₁ and R₂ or R₃ and R₄ substituents taken together may form an alkylene or alkenylene chain having from 2 to 20 carbons atoms completing a 4, 5 or 6 membered ring system which may include one or more heteroatoms of oxygen, nitrogen or sulfur such as 1,4-butandiyl, 1,2-ethanediyl, —CH₂SCH₂—, —CH₂OCH₂—, —CH₂CH₂—NH—CH₂—, or —CH₂CH₂—NH—.

R₅ to R₁₂ are the same or different at each occurrence and are hydrogen, alkyl having from 1 to about 12 carbon atoms, substituted alkyl, phenyl, substituted phenyl; alkyltnio having from 1 to about 12 carbon atoms or alkoxy having from 1 to about 12 carbon atoms; alkylamino having about 1 to about 12 carbon atoms or any of R₅ and R₆, or R₇ and R₈, or R₉ and R₁₀ substituents together may form an alkylene chain having 2 to about 20 carbon atoms completing a 4, 5 or 6 membered ring system which may include one or more heteroatoms of oxygen or sulfur such as 1,4-butandiyl, 1,2-ethanediyl or —CH₂SCH₂— or —CH₂OCH₂—;

$X_1$ and $X_2$ are the same or different and are oxygen, sulfur or $-NR_{15}$ wherein $R_{15}$ is hydrogen or alkyl, or $R_1$;

D is selected from the group consisting of moieties of the formula;

(a) $OR_1$ wherein $R_1$ is hydrogen; alkyl, such as methyl, ethyl, propyl, butyl, hexyl, and octyl; alkanoyl, benzoyl or alkyl or alkoxy substituted benzoyl, such as benzoyl, butanoyl, ethanoyl; phenyl; alkylphenyl and alkoxyphenyol such as tolyl and anisyl; alkoxyalkyl such as methoxyethyl; and phenylalkyl such as benzyl or phenethyl;

(b)

where $R_1$ and $R_2$ are the same or different at each occurrence and are alkyl such as methyl, ethyl, or butyl, or $R_1$ and $R_2$ together form a alkylene or alkenylene chain containing one or more unsaturations such as 1,4-butanediyl, 1,3-propanediyl or 1,5-pentanediyl completing a saturated ring structure, or an aromatic or heterocyclic ring structure;

(c) $-N^+R_1R_2R_3Z^-$,

and $-P^+R_1R_2R_3Z^-$, where $R_1$, $R_2$, $R_3$ are the same or different at each occurrence and are alkyl such as methyl, ethyl, propyl, and butyl; phenyl; arylalkyl such as benzyl and phenethyl; alkylphenyl and alkoxyphenyl such as tolyl and anisyl; and alkoxyalkyl such as methoxymethyl; or two or three of $R_1$, $R_2$ and $R_3$ together may form an alkylene or alkenylene chain having one or more degrees of unsaturation completing a saturated ring structure, such as piperidinium or an aromatic or heterocyclic ring structure such as pyridinum;

(d) pseudohalogens such as $-CN$, $-OCN$, SCN, and $-N_3$; and (e) $-SiR_1R_2R_3$ wherein $R_1$, $R_2$, $R_3$ are the same or different at each occurrence and are alkyl such as methyl, ethyl, butyl, and propyl; phenyl; phenylalkyl such as benzyl and phenethyl; and alkylphenyl and alkoxyphenyl such as tolyl and anisyl; and $Z^-$ is $F^-$, $ClO_4^-$, $ClO_3^-$, $KS_2O_8^-$, $BF_4^-$, $PF_6^-$, $SbF_6^-$, $NaSO_3^-$, $CH_3CH_2SO_3^-$, $Cl^-$, $Br^-$, $I^-$, $NO_3^-$, $CH_3SO_3^-$, $HSO_4^-$, $CF_3SO_3^-$, $CH_3CO_2^-$, $CH_3C_6H_4SO_3^-$, $FeCl_4^-$, and $H_2PO_4^-$.

Particularly preferred for use in the practice of this invention are homopolymers and random copolymers of the above-referenced Formula I to XIV wherein;

q is an integer from 0 to about 3;

m, and the sum of n, o and p are at least about 500 and at least one of n or o is greater than zero.

$R_1$, $R_2$, $R_3$ and $R_4$ are the same or different at each occurrence and are hydrogen; alkyl having from 1 to about 12 carbon atoms such as ethyl, methyl, propyl, n-butyl, sec-butyl, n-hexyl, n-octyl, and n-dodecyl; phenyl; alkoxy having from 1 to about 12 carbon such as methoxy, nonoxy, dodecanoxy, ethoxy and butoxy; alkylthio having from 1 to about 12 carbon atoms such as methylthio, ethylthio, propylthio, and butylthio; alkoxyalkyl having from 1 to about 12 carbon atoms such as ethoxymethyl and butoxymethyl; or a moiety of the formula:

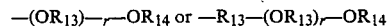

wherein:

$R_{13}$ is alkylene of about 2 to 3 carbon atoms;
$R_{14}$ is alkyl of from 1 to about 3 carbon atoms; and
r is a natural number from 1 to about 10;

$R_5$, $R_6$, $R_7$, $R_8$, $R_9$, $R_{10}$, $R_{11}$ and $R_{12}$ are the same or different at each occurrence and are hydrogen; alkyl, such as methyl, ethyl or the like; substituted alkyl such as butylsulfonic acid, propylsulfonic acid, cyanomethyl, epoxybutyl, pentafluoroethyl, nitropropyl, and butylcarboxylic acid; alkoxy such as methoxy, ethoxy, butoxy, and the like; and alkylthio such as methylthio, ethylthio and the like; or any of $R_5$ and $R_6$, $R_7$ and $R_8$, $R_9$ and $R_{10}$, together may be propylene, butylene or a like divalent alkylene group forming an alicyclic ring;

$Z^-$ is $Cl^-$, $Br^-$, $BF_4^-$, $PF_6^-$, $NO_3^-$, $ClO_4^-$, $I^-$, $ClO_3^-$, $HSO_3^-$, $CH_3SO_3^-$, $KS_2O_8^-$, $SbF_6^-$, $HSO_4^-$, $CF_3SO_3^-$, $CH_3CO_2^-$, $CH_3CH_2SO_3^-$, or $CH_3C_6H_4SO_3^-$; $H_2PO_4^-$, $FeCl_4^-$, $X_1$ and $X_2$ are the same or different and are oxygen or sulfur; and D is the same or different at each occurrence and is;

(a) $-OR_1$ or $-SR_1$ where $R_1$ is hydrogen; alkyl as methyl, ethyl, butyl, and octyl; phenyl; alkylphenyl and alkoxyphenyl such as tolyl and anisyl; phenylalkyl such as benzyl and phenethyl; and alkanoyl and aryloyl such as acetyl and benzoyl;

(b) $-N^+R_1R_2R_3.Z^-$, wherein $R_1$, $R_2$ and $R_3$ are aryl such as phenyl; alkyl such as methyl, ethyl, and butyl, such as acetyl, alkoxy alkyl such as methoxymethyl; arylalkyl such as benzyl and phenethyl; alkanoyl and alkylphenyl and alkoxyphenyl such as tolyl and anisyl; or $R_1$, $R_2$ and $R_3$ together form an alkylene or alkenylene chain such as 1,4-butanediyl, 1,5-pentanediyl, and 1,5-pent-1,3,5-trienediyl, completing a ring structure such as pyridinium; and piperidinium; and (c) halogen or psuedohalogen, such as OCN, $-CN$, $-SCN$, and $-N_3$; and $Z^-$ is $Cl^-$, $CF_3SO_3^-$, $FeCl_4^-$, $Br^-$, $F^-$, $I^-$, $BF_4^-$, $PF_6^-$, $NO_3^-$, $ClO_4^-$, $ClO_3^-$, $CRO_2^-$, $CH_3CO_2^-$, $KS_2O_8^-$, $SbF_6^-$, $HSO_4^-$, $CH_3C_6H_4SO_3^-$, $H_2PO_4^-$, and the like.

Amongst these particularly preferred embodiments, most preferred are random copolymers and homopolymers of Formula I to XIV in which;

q is an integer from 0 to about 2;

m, or the sum of n, o and p is at least about 1000

$R_1$ to $R_4$ are the same or different at each occurrence and are hydrogen, alkyl having 1 to about 12 carbon atoms, alkoxy having 1 to about 12 carbon atoms, or alkoxyalkyl having 2 to about 12 carbon atoms or a moiety of the formula:

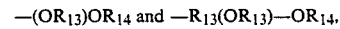

wherein;

$R_{13}$ is $-(CH_2)_2-$ or $-CH_2CH(CH_3)-$;
$R_{14}$ is $-CH_3$ or $-CH_2CH_3$; and
r is a natural number 1 to about 6;

$R_5$, $R_6$, $R_7$, $R_8$, $R_9$, $R_{10}$, $R_{11}$, and $R_{12}$ are the same or different at each occurrence and are hydrogen, alkyl, or any of $R_5$ and $R_6$, $R_7$ and $R_8$, $R_9$ and $R_{10}$, together may form a divalent alkylene group having from 2 to about 6 carbon atoms forming an alicyclic ring;

D is the same or different at each occurrence and is;

(a) —OR$_1$ or —SR$_1$— wherein R$_1$ is hydrogen; or alkyl such as methyl, ethyl, propyl, and butyl; phenyl; alkanoyl such as acetyl; and (b) —N$^+$R$_1$R$_2$R$_3$.Z$^-$, wherein R$_1$, R$_2$, R$_3$ ar as methyl; ethyl; and butyl; benzyl; phenyl; phenethyl; or two or more of R$_1$, R$_2$ and R$_3$ together may form an alkylene or alkenylene chain such as 1,4-butanediyl, 1,5-pentanediyl, and 1,5-pent-1,3,5-trienediyl completing a saturated cyclic structure or aromatic or heterocyclic structure such as pyridinium; and (c) Z$^-$ is Cl$^-$, Br$^-$, I$^-$, BF$_4^-$, PF$_6^-$, NO$_3^-$, ClO$_4^-$, ClO$_2^-$, ClO$_3^-$, CH$_3$CO$_2^-$, KS$_2$O$_8^-$, SbF$_6^-$, HSO$_4^-$, CH$_3$SO$_3^-$, or CH$_3$C$_6$H$_4$SO$_3^-$, H$_2$PO$_4^-$, FeCl$_4^-$; and (d) X$_1$ and X$_2$ are sulfur, and NH.

Especially good results are provided in those embodiments of the invention where D is a moiety of the formula:

wherein R$_1$, R$_2$, R$_3$ and Z$^-$ are as described above.

This invention also relates to solutions of the homopolymers and copolymers of Formula I to VII comprised of one or more of said copolymers and homopolymers and a protic and/or an aprotic solvent. Useful solvents can vary widely and include such solvents as water N-methyl pyrrolidone, dimethyl sulfoxide, water, ethanol, methanol,butanol, propanol, hexamethyl phosphoric triamide, dimethylformamide, dimethylacetamide, propylene carbonate, sulfolane and the like, or mixtures thereof.

The solvent chosen for use in any particular situation will usually depend on the nature of the various substituents. For example, the more polar the particular substituents, the more polar the solvent; and conversely, the less polar the substituent the less polar the solvent. In the preferred embodiments of this invention, solvents are selected from the group consisting of water, methanol, butanol, sulfolane, dimethyl sulfoxide, dimethylformamide, N-methyl pyrrolidinone and mixtures thereof, and in the particularly preferred embodiments of the invention the solvent is selected from the group consisting of water, sulfolane, methanol, butanol, and dimethyl formamide and mixtures there of. Particularly preferred is water.

The copolymers and homopolymers of Formulas I to VII can be conveniently prepared in a two step procedure. In the first step, a compound or group of compounds, whichever is applicable, of the following Formulas XV to XXI;

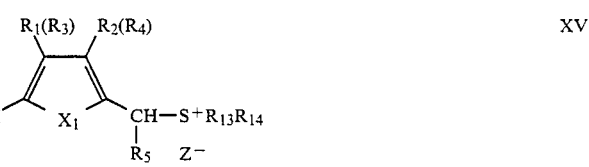

XV

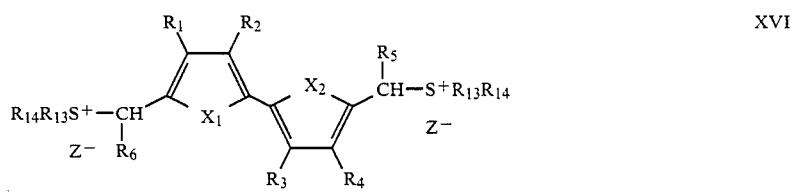

XVI

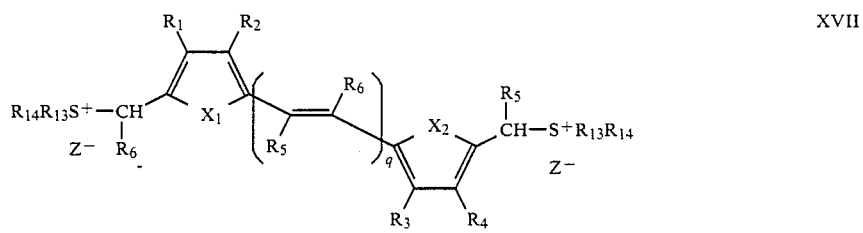

XVII

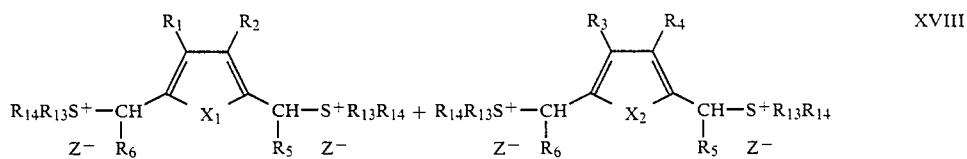

XVIII

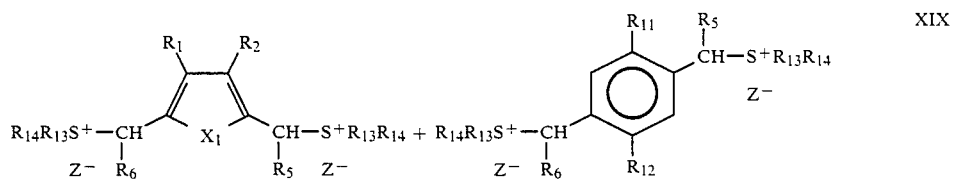

XIX

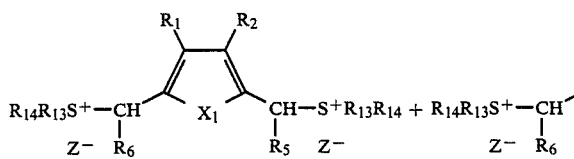 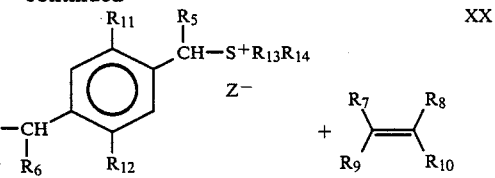
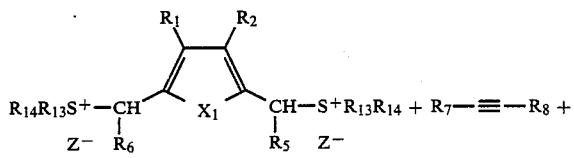 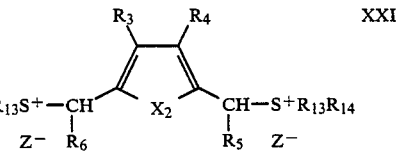
is treated with one equivalent of base to form polymers of the Formula XXII to XXVIII;
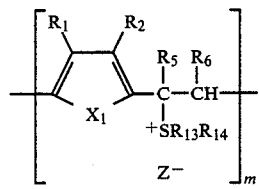
XXII
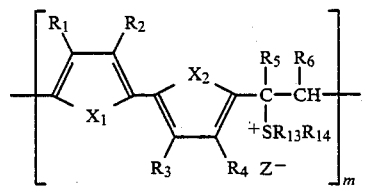
XXIII
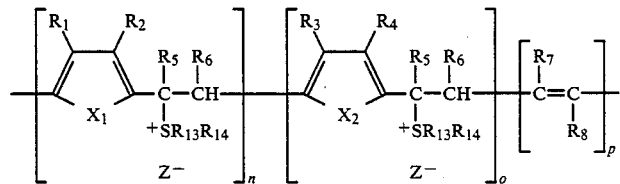
XXIV
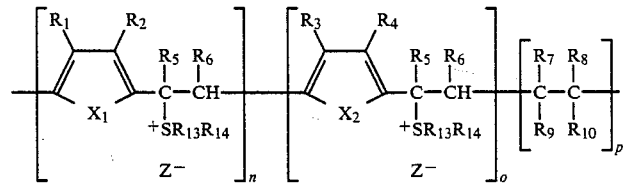
XXV
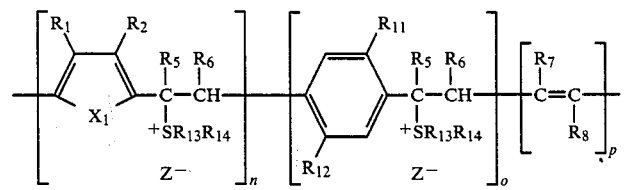
XXVI
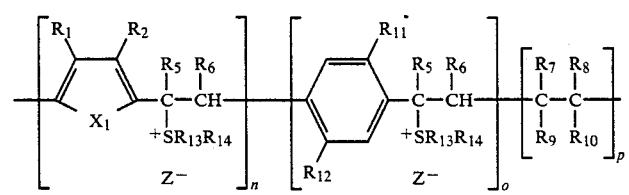
XXVII

XXVIII

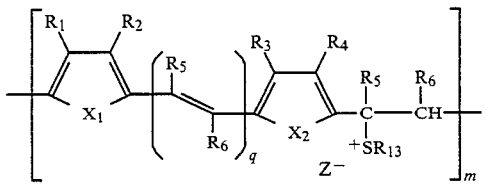

In general, this reaction is carried out in solution using the protic or aprotic solvents described above. Bases for use in this reaction are not critical and the only requirement being that the base is slightly soluble in the solvent in which the reaction is being conducted. Illustrative of useful bases are alkali metal hydroxides such as sodium hydroxide, lithium hydroxide, and potassium hydroxide; alkali metal carbonates and bicarbonates such as sodium carbonate, sodium bicarbonate, potassium carbonate, and potassium bicarbonate; and alkali metal alkoxides such as potassium t-butoxide, lithium methoxide, lithium ethoxide, sodium methoxide, sodium ethoxide, potassium methoxide, and potassium ethoxide. Preferred bases are sodium hydroxide, lithium hydroxide, potassium hydroxide, sodium methoxide, sodium ethoxide, potassium t-butoxide and sodium carbonate, and particularly preferred bases are sodium hydroxide, lithium hydroxide, potassium hydroxide, sodium methoxide, and sodium ethoxide. Amongst these particularly preferred embodiments, most preferred are those embodiments of the invention in which the base is sodium hydroxide, potassium hydroxide, lithium hydroxide, and sodium methoxide.

As noted above, solvents for use in this process are those in which the polymers of Formulas XXII-XXVIII are soluble and can vary widely. Preferred solvents are water, methanol, ethanol, butanoyl, dimethylsulfoxide, sulfolane, dimethylformamide, N-methylpyrolidone and acetonitrile, and particularly preferred solvents are water, methanol, ethanol, dimethylformamide, and N-methylpyrolidone. Amongst those particularly preferred solvents, most preferred solvents are methanol, ethanol, dimethylformamide and water.

Reaction temperatures are not critical, and can vary widely. In general, the polymerization reaction is carried out at a temperature of from about $-15°$ C. to about 200° C. In the preferred embodiments reaction temperatures of from about $-15°$ C. to about 50° C., and in the particularly preferred embodiments reaction temperatures are from about $-5°$ C. to about 5° C.

Reaction pressures are not critical and the reaction can be carried out at sub-atmospheric pressure, atmospheric pressure and super-atmospheric pressure. For convenience, the reaction is carried out at atmospheric or autogeneous pressure.

Reaction times can vary widely. In general, the reaction is carried out over a period of from about a few seconds to a few hours.

In the second step of the process, the solutions of polymers of the Formulas XXII to XXVIII are treated with various agents or mixtures thereof to stabilize the polymers against elimination or gel formation and to form the other polymers of the Formula I to VI may vary widely and depends on the nature of the D moiety. Illustrative of useful stabilizing agents are species of the formula:

(a) $MOR_1$ where M is hydrogen or an alkali metal ion and $R_1$ is as described above such as hydrogen, alkyl from about 1 to about 20 carbons, aryl, arylalkyl, alkylaryl or alkanoyl. Illustrative of suitable compounds of the Formula $MOR_1$ are water, sodium hydroxide, potassium hydroxide, sodium methoxide, sodium ethoxide, butanol, methanol, ethanol, potassium phenoxide, sodium acetate, potassium benzoate, and the like.

(b) $MSR_1$ where M is hydrogen, alkali metal ion, or transition metal ion and $R_1$ is as described above such as hydrogen, alkyl from 1 to about 20 carbons, aryl, alkylaryl, arylalkyl or alkanoyl. Illustrative of suitable $MSR_1$ compounds are lithium thioethoxide, sodium thiomethoxide, sodium thiopenoxide, sodium thioacetate, and the like.

(c) $NR_1R_2R_3$ where $R_1$, $R_2$ and $R_3$ are the same or different at each occurrence and are as described above such as hydrogen, alkyl from 1 to about 20 carbons, aryl, alkylaryl or arylalkyl, or $R_1$, $R_2$, $R_3$ form an alkylene or alkenylene chain completing a monocyclic or bicyclic, alicyclic, aromatic or heterocyclic ring system. Illustrative of suitable $NR_1R_2R_3$ compounds are triethylamine, ethylamine, diethylamine, cyclohexylamine, benzylamine, α-phenylethylamine, tri-propylamine, methylaniline, diphenylamine, pyrazole, imidazole, oxazole, thiazole, or heterocyclic compounds such as pyridine, 1,2-dihydroquinoline, methylethylamine, benzyldimethylamino, N,N-dimethylaniline, trimethylamine, dimethylethylamine, piperidine, 5,6-benzoquinoline, N-methyl piperdine, pyrrolidine, picoline, quinoline, isoquinoline, pyrrole, carbazole, purine, purimidine, morpholine, and the like.

(d) $SR_1R_2$ where $R_1$ and $R_2$ are the same or different and are as described above, such as hydrogen, alkyl from 1 to about 20 carbons, aryl, alkylaryl or arylalkyl, $R_1$ and $R_2$ together may form an alkylene or alkenylene chain such as 1,4-butanediyl, completing an aromatic or heterocyclic ring structure or an aryl group of the formula:

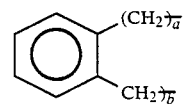

wherein a and b are the same or different and are integers from 0 to about 3. Illustrative of such compounds are dibutylsulfide, dimethylsulfide, diphenylsulfide, 4,4'-ditoylsulfide, ethylphenylsulfide, dipropyl sulfide, 4,4'-dimethoxyphenyl sulfide, dibenzylsulfide, thiophene, thiazole, benzylphenyl, sulfide, butylethylsulfide, and thiophane.

(e) $PR_1R_2R_3$, wherein $R_1$, $R_2$ different at each occurrence and are as described above such as alkyl from 1 to about 20 carbons, aryl, alkylaryl, arylalkyl, alkoxy from 1 to about 20 carbons, aryloxy, alkylaryloxy or arylalkyloxy. Illustrative of such compounds are diphenylethyl phosphene, triethyl phosphene, triphenyl phosphene, triethylphosphene, benzyl dimethyl phosphene, phenethoxy diethylphosphene, triphenoxyphosphene, tripentylphosphene, tri-(3-tolyl)phosphene, tri-(4-tolyl phosphene), and the like.

(f)

wherein M is hydrogen or alkali metal ion such as lithium, sodium or potassium, and $R_1$ is as described above such as alkyl from about 1 to about 20 carbons, aryl, arylalkyl or alkylaryl. Illustrative of these materials are potassium ethyl xanthate, sodium phenyl xanthate and the like.

(g) MX wherein M is alkali metal ion and X is $Cl^-$, $F^-$, $Br^-$, $I^-$, $CN^-$, $OCN^-$, $N_3^-$, $HSO_3^-$, $SO_3^-$, $SCN^-$, and the like. Illustrative of these materials are sodium iodide, sodium azide, sodium cyanide, sodium thiocyanide, sodium isocyanate, and the like.

(h) $MSeR_1$ wherein M is alkali metal ion or hydrogen and $R_1$ is as described above such as alkyl of from about 1 to about 20 carbons, aryl, alkylaryl, or arylalkyl. Illustrative of these materials are sodium methyl selenide, sodium phenyl selenide, sodium 4-tolyl selenide, sodium benzyl selenide, sodium phenethyl selenide, and the like.

(i) $M_2CO_3$ wherein M is nydrogen or alkali metal or a combination of the two such as sodium carbonate, sodium bicarbonate and the like.

(j) $MP(OR_1)_2$ wherein M is hydrogen, alkalimetal ion such as lithium, sodium and potassium, or $-OR_1$ where $R_1$ is alkyl having from 1 to about 10 carbon atoms, or aryl, alkylaryl or arylalkyl having from 6 to about 20 carbon atoms. Illustrative of these materials are lithium dimethoxy phospinate. trimethoxy phosphine, tributoxyphosphine, potassium dibutoxy phosphinate and the like.

(k) $R_1SOR_2$ wherein $R_1$ and $R_2$ are the same or different and are alkyl having from 1 to about 10 carbon atoms, or aryl, arylalkyl or alkylaryl having from about 6 to about 20 carbon atoms. Illustrative of these materials are dimethylsulfoxide, diethylsulfoxide, methylphenyl sulfoxide and the like.

(l)

wherein $R_1$ and $R_2$ are the same or different and are alkyl having from 1 to about 10 carbon atoms, or aryl, alkylaryl, or arylalkyl having from about 6 to about 20 carbon atoms, or $R_1$ and $R_2$ together may form a cyclic structure. Illustrative of these materials are N, N-dimethyl hydroxyl amine, N,N-diethyl hydroxyl amine, N-phenyl-N-methyl hydroxyl amine, 1-hydroxypiperidine and the like.

(m)

wherein M is an alkali metal ion such as lithium, sodium or potassium, and R and $R_2$ are the same or different and are alkyl having from 1 to about 10 carbon atoms, or aryl, alkylaryl or arylalkyl having from about 6 to about 20 carbon atoms. Illustrative of these materials are lithium dimethyl phosphate, sodium dimethyl phosphate, potassium diphenyl phosphate and the like.

(n) $MSiR_1R_2R_3$ wherein M is an alkali metal ion such as lithium, sodium or potassium, and $R_1$, $R_2$ and $R_3$ are the same or different and are alkyl having from 1 to about 10 carbon atoms; or aryl, alkylaryl or arylalkyl having from about 6 to about 20 carbon atoms. Illustrative of these materials are lithium tributyl silane, sodium trimethylsilane, potassium triphenyl silane and the like.

(o) $NSO_3^-M^+$ wherein M and N are the same or different and are hydrogen, or alkali metal such as lithium, potassium and sodium. Illustrative of these materials are sodium bisulfite, lithium sulfite, potassium bisulfite and the like.

Although we do not wish to be bound by any theory, we believe that these stabilizing agents function in certain cases as mucleophiles to displace the labile sulfonium groups in polymers of Formulas XXII to XXVIII to give conjugated polymers of Formulas I to VII which contain D groups which are less prone to thermal elimination but which can eliminate by other means such as chemical, electrochemical or photochemical to give polymers of Formulas VIII to XIV In cases where the stabilizing agent can function as a weak base, we believe these act as acid scavengers for traces of HZ released by gradual thermal elimination of the sulfonium groups from Formulas XXII to XXVIII. We believe that traces of HZ in the presence of the newly fomed unsaturated bonds causes a low degree of crosslinking thereby giving rise to gel formation.

By judicious choice of stabilizing agent or agents, reaction solvent and reaction time, the properties of polymers of Formulas I to VII can be tailored to meet desired processing conditions, film forming properties, and morphology of the desired conjugated polymers of Formulas VIII to XIV.

Particularly preferred stabilizing agents are those of the formula:

$MOR_1$ wherein M is hydrogen or alkali metal ion, and $R_1$ is hydrogen or alkyl of 1 to about 10 carbons, phenyl, or benzyl;

$MSR_1$ where M is alkali metal ion, hydrogen, and $R_1$ is hydrogen, alkyl of 1 to about 10 carbons, phenyl, or benzyl;

$NR_1R_2R_3$, wherein $R_1$, $R_2$, and $R_3$ are the same or different at each occurrence and are hydrogen, alkyl of 1 to about 10 carbons, phenyl or alkylphenyl, alkoxyphenyl or phenylalkyl having from about 6 to about 20 carbon atoms or $R_1$, $R_2$, $R_3$ taken together may form an alkylene or alkenylene chain which may form a monocyclic or bicyclic or alicyclic or aromatic ring structure of from about 6 to about 20 carbon atoms;

$PR_1R_2R_3$, wherein $R_1$, $R_2$, and $R_3$ are alkoxy, aryloxy, alkylaryloxy, arylalkyloxy or alkyl;

$M_2CO_3$, wherein M is alkali metal ion or hydrogen, or a combination thereof; and

wherein M is alkali metal ion, and $R_1$ is alkyl from 1 to about 10 carbons or phenyl.

Most particularly preferred stabilizing additives are sodium methoxide, sodium ethoxide, butanol, methanol, sodium thiomethoxide, pyridine, trimethylamine. triethylamine, tributylamine, quinoline, tributylphosphine, triphenylphosphine, trimethylphosphine, triethylphosphine, triphenylphosphine, sodium carbonate, sodium bicarbonate, potassium xanthate, sodium thiophenoxide, 4-dimethylaminopyridine.

Another aspect of this invention relates to a process for preparing neutral conjugated backbone copolymers and homopolymers of the Formulas VIII to XIV which are prepared from the corresponding polymers of the Formula I, II, III, IV, V, VI and VII. In general, these neutral conjugated backbone polymers are prepared by thermal treatment of the precursor polymers of Formulas I to VII, either as solutions or in the solid state as precast or prefabricated articles. Generally, useful temperatures may range from about $-10°$ C. to about 300° C. The thermal treatment eliminates DH. Useful temperatures depend on the structure of the polymer, the nature of D and the nature of $Z^-$, if present, and may vary widely. Temperatures which are generally useful can be determined by routine experimentation and should be such that preferably greater than about 80 mole % of DH are eliminated from the prepolymer, and more preferably temperatures should be such that at least about 90 mole % of DH is eliminated.

If HZ is an oxidant, as for example $HClO_4$, $HClO_3$, $H_2SO_4$, $HFeCl_4$, $HS_2O_8K$, $HFeO_4$, $HMnO_4$, $HBrO_3$ or the like, the conjugated backbone polymer will be spontaneously doped by the HZ after elimination. For these embodiments of the invention, preferred Z anions are $ClO_4^-$, $ClO_3^-$, $ClO_2^-$, $ClO^-$, $HSO_4$, $FeCl_4^-$, $KS_2O_8^-$, $FeO_4^-$, $MnO_4^-$, and $BrO_3^-$.

Chemical methods can also be used to convert prepolymers I to VII into conjugated polymers of Formulas VIII to XIV. In these chemical methods, the precursor polymers of Formulas I to VII, either in solution or in the solid state, are treated with a chemical agent which causes elimination of DH. Lewis bases are particularly useful such as the hydroxides, ethoxides, butoxides, and isopropoxides of sodium, potassium and lithium, sodium or lithium hydride, amines such as trimethylamine, tributylamine and the like, ammonium hydroxides such as ammomium hydroxide, tetrabutyl ammonium hydroxide and the like, and carbonates such as sodium, potasium or lithium carbonate.

The rate of DH elimination can be controlled by temperature, choice of solvent and base type.

Lewis and Bronsted acids, and other chemical dehydrating agents such as acyl chlorides and anhydrides, or a combination of acid and dehydrating agent, are particularly effective for the elimination of DH moieties, where D is of the formula:

—$OR_1$, wherein R is hydrogen, alkyl, aryl, arylalkyl or alkylaryl, and

—$SR_1$, wherein $R_1$ is as above.

Useful acids are HCl, HBr, HI, $CF_3SO_3H$, $CF_3CO_2H$, $HClO_4$, $H_3PO_4$, $H_2SO_4$, and the like. Acids with a pKa less than about 2 are useful, preferably acids with a pKa less than about 1, most preferred are acids with pKa less than about $-2$. Useful dehydrating agents are trifluoroacetic anhydride, acetic anhydride, acetyl chloride, benzoyl chloride, trimethyl silyl chloride, benzene sulfonyl chloride, and the like.

The electrically conductive forms of the polymers of Formulas VIII to XIV are formed by doping corresponding neutral forms of the polymer in solution or in the solid state. In general, these doped conductive forms are prepared by treatment of the conjugated polymer with chemical oxidizing agents (p-type dopants) or by electrochemical oxidation at the anode in an electrochemical cell. These procedures are described in more detail in U.S. Pat. Nos. 4,442,187 and 4,321,114. Dopants for use in the practice of this invention can vary widely and can be such materials which are known in the art for use in doping conjugated backbone polymers to form conductive or semi-conductive polymers, as for example those described in detail in U.S. Pat. Nos. 4,442,187 and 4,321,114 which are hereby incorporated by reference.

As was noted above, this invention also relates to solutions of the polymers of Formulas I to XXVIII. The solvent type employed can vary widely, from polar to non-polar. Useful solvents include water and various organic solvents. In general, organic solvents which can be used in the practice of this invention will have a dipole moment greater than zero and less than or equal to about 5, and a dielectric constant of less than about 190. Illustrative of useful solvents are water, alcohols, such as methanol, ethanol, propanol, trifluoroethanol, benzyl alcohol, butanol and the like, amines such as triethylamine, tributylamine, diethylamine, pyridine, and the like, acids such as trifluoroacetic, acetic, formic, methane sulfonic, sulfuric and trifluoromethane sulfonic acids; anhydrides such as acetic anhydride, propioanhydride, and the like, sultones, such as propane sultone, butane sultone, pentane sultone and the like; alkyl alkanesulfonates such as methyl methanesulfonate, ethyl methanesulfonate, butyl methanesulfonate, propyl ethanesulfonate and the like; linear and cyclic ethers such as 1,2-dimethoxyethane, dimethoxymethane, dioxane, glymes, diglymes, tetrahydrofuran, 2-methyltetrahydrofuran, anisole, diethylether and the like; nitriles such as acetonitrile, propionitrile, butyronitrile, benzonitrile and the like; hydrocarbons such as cyclohexane, pentane, hexane and cyclopentane; halocarbons such as carbon tetrachloride, dichloromethane, and 1,2-dichloroethane, trichloroethylene; aromatic solvents such as benzene, toluene, xylene, nitrobenzene and the like; ketones such as 4-methyl-2-pentanone, methylethylketone, acetone, and the like; carbonates such as propylene carbonate, dimethyl carbonate, ethylene carbonate and the like; esters such as methyl formate, methyl acetate, $\gamma$-butyrolactone, ethyl acetate and the like; nitroalkanes, such as nitromethane, nitroethane, nitropropane, and the like; amides such as N-methyl formamide, N-ethyl acetamide, dimethyl formamide, dimethyl thioformamide, N,N-dimethyl acetamide, N-methylpyrrolidinone and the like; organophosphorus compounds such as hexamethyl phosphorous triamide, diethylphosphate, triethylphosphate, trimethylphosphate and the like; and organosulfur compounds such as sulfolane, methyl sulfolane, dimethyl sulfone, dimethyl sulfoxide, dimethyl sulfolane, glycol sulfite, tetraethylsulfamide and the like. Mixtures of such solvents can also be used as for example mixtures of sulfolane and acetonitrile, or water and methanol.

The solvent or solvent mixture selected for use in any particular situation will depend primarily on the polarity of various $R_1$, $R_2$, $R_3$, $R_4$, $R_5$, $R_6$, $R_7$, $R_8$, $R_9$, $P_1$, $R_2$, $R_{10}$, $R_{11}$, and/or $R_{12}$ substituents, and/or the state of the polymer, i.e. doped or undoped. In general, more polar substituents and higher doping levels of the polymer, will require solvents with higher dielectric constants and dipole moments (within the above specified range). Conversely, less polar substituents and lower doping levels of the polymer, will require solvents ith lower dielectric constants and dipole moments (within the above specified ranges).

In general, solvents chosen for use with polymers having relatively polar substituents will usually have a dipole moment of from about 0.3 to about 5.0, preferably from about 2.5 to about 5.0; and a dielectric constant of from about 2.0 to about 190, preferably from about 20 to about 100. Illustrative of such solvents are alcohols, such as methanol, ethanol, isopropanol, and the like; linear and cyclic ethers, such as tetrahydrofuran, tetrahydropyran, 2-methyltetrahydrofuran, diethylether, diglyme, glyme and the like; halocarbons such as chloroform,1,2-dichloroethane, dichloromethane and the like; amides, such as dimethylformamide, N,N'-dimethylacetamide, N-methyl pyrrolidone and the like; substituted aromatics, such as xylene, anisole, toluene and the like; nitriles, such as acetonitrile, propionitrile, benzonitrile, butyronitrile, and the like; sulfoxides and other sulfur containing solvents such as dimethylsulfoxide and the like; nitro substituted alkanes and aromatics such as nitromethane, nitropropane, nitrobenzene and the like; and carbonates such as propylene carbonate, ethylene carbonate and the like, and water or mixtures thereof.

In general solvents chosen for use with undoped polymers and/or those having relatively non-polar substituents will have a dipole moment of from about 0 to about 3.0, preferably from about 0 to about 2.0; and a dielectric constant of from about 2.0 to about 50, preferably from about 2.0 to about 35. Illustrative of such solvents are halocarbons such as dichloromethane, and the like; aromatic solvents such as toluene, xylene, benzene and the like; cyclic and linear ethers such as dimethoxyethane, tetrahydrofuran and the like; esters such as ethylacetate, methyl formate and the like; sulfoxides. such as dimethylsulfoxide and the like; cyclic and linear amides, such as dimethylformamide, N-methylpyrrolidone, N,N-dimethylacetamide and the like; and ketones such as acetone and the like, and water.

The proportion of polymer and solvent in the solution of this invention containing the neutral copolymer or homopolymer and the organic solvent. However, the following guidelines are believed important for achieving solutions particularly useful in the present invention. In general, the amount of solvent as a proportion of the amount of solution is not believed to be critical, since any amount as a liquid will form at least a viscous gel with doped or undoped polymers. These viscous embodiments of the invention are particularly useful for silkscreening and for applying thick film coatings on substrates. For other applications, it may be preferred, however, to use sufficient liquid solvent to lower the viscosity of the gel or solution to a point where it flows at least sufficiently to conform to a container shape or mold in a reasonably short period of time, e.g., in 30 minutes or less. Preferably, the solvent is present in sufficient amounts to lower the viscosity of the solution to less than about 2,000 centipoise, and more preferably from about 1 to about 1000 centipoise.

The solution of this invention may include a third ingredient which is an electron dopant solute. The purpose of the dopant is to dope the conjugated backbone polymer of Formulas VIII to XVI formed from the polymers of Formulas I to VII, and render it electrically conductive both in solution, and in the solid article derived from the solution. In general, such a solute is derived from a compound which upon addition ionizes the conjugated backbone polymer of Formulas VIII to XVI with co-committent formation of an anionic dopant solute species. The dopant for use in the practice of this invention can vary widely and can be such materials which are known in the art for use in doping conjugated backbone polymers to form conductive or semiconductive polymers, as for example those described in detail in U.S. Pat. Nos. 4,442,187 and 4,321,114 which are hereby incorporated by reference. Other useful dopants include air (oxygen), peroxides such as bis(methylsulfonyl)peroxide, hydrogen peroxide, or mixtures of dopants.

The amount of added dopant is not critical but should be sufficient to render the polymer conductive, either in solution or in the solid state, to a level of at least about $10^{-5}$ S/cm, preferably $10^{-3}$ S/cm, more preferably at least about $10^{-1}$ S/cm, and most preferably at least about 10 S/cm.

In addition to the essential copolymer or homopolymer and solvent, whichever is applicable, the solutions of this invention can include other optional ingredients which either dissolve or do not dissolve in the solution. The nature of such optional ingredients can vary widely, and include those materials which are known to those of skill in the art for inclusion in polymer articles. In the case of dissolvable components, materials may be present which alter the physical or mechanical properties of either the solution or the articles eventually cast from the solution. Examples of such materials include other conventional polymers such as polyacrylonitrile, polyvnylidine chloride, polyethylene oxide, polystyrene, nylon, polyvinylsulfonic acid, cellulose acetate butyrate, polypropylene, polyethylene, cellulose acetate, polyphenylene oxides and the like. In the case of nonsoluble fourth components, materials may be present which either fill or form a substrate for the conductive polymer cast from the solution. These fourth components include other polymers, other polymers such as polyacetylene which may become conductive upon doping, graphite, carbons, metal conductors, reinforcing fibers and inert fillers (such as clays and glass).

The method of forming the solutions of this invention is not critical and can vary widely. For example, the solution of this invention can be prepared merely by dissolving the desired amount of the polymer in a solvent in which it is soluble such as water, toluene or nitrobenzene. Or, solutions can be formed by directly polymerizing the monomers in the solvent.

Various methods are contemplated for using the solution of the present invention. For example, it is contemplated to remove the solvent from the solution to allow the copolymer or homopolymer to solidify. The solvent can be removed from the solution through use of any conventional solvent removal method but is removed preferably by evaporation. Alternatively, the solvent can be removed by extraction with an extractant in which the solvent is substantially more soluble than the polymer.

As will be appreciated by those skilled in polymer processing, the ability to form polymer articles by removing a solvent from a solution enables one to prepare articles of a wide variety of shapes and sizes. Thus, for example, by removing volatiles from the present solution spread on a surface, films of any desired thickness can be prepared. By extruding the solution through a die, fibers or films can be made. Similarly, by removing volatiles from the solution in a mold of various shapes, shaped articles conforming in shape to the mold can be prepared. It will be appreciated that some shrinkage might occur between the solution in its last flowable state to the final article, but such shrinkage is conventionally accounted for in molding polymers from solution. It is also contemplated that, once a solution is formed, a partial or substantial removal of solvent will occur prior to placing the solution on a surface or in a mold, with the final venting of solvent occurring on the surface or in the mold. It is contemplated that, if fourth or additional soluble components are introduced into the solution, they will, unless also volatile, be present in the shaped article formed. If the fourth component is a non-volatile liquid, then the removal of volatile components may leave a new liquid or plasticized form of doped conducting polymer or undoped neutral polymer. If the additional components are volatile, then foamed or expanded cellular forms of the polymer may be formed.

The polymers of Formula I to VII or blends of such polymers and one or more thermoplastic polymers can also be melt processed into useful articles using conventional melt processing techniques. For example, if a blend is used, the various components are granulated, and the granulated components mixed dry in a tumbler, Banbury mixer or other suitable mixer. The components of the blend are usually mixed until the blend is uniform or as homogenous as possible. The blend is then heated above the melting point of at least one of the polymeric components preferably with mixing. For example, the blend may be conventionally melted by heating in a conventional extruder. As will be appreciated by those of skill in the polymer processing, the ability to be melt processed enables one to manufacture articles of a wide variety or shapes merely by placing the melt in a mold of the desired shape and cooling the melt below the melting point of at least one of the polymer components. For example, by spreading a melt on a surface and cooling, films of any desired thickness can be fabricated. Similarly, fibers and films can be made by extruding the melt through a suitable die, and shaped articles can be formed by placing a melt into a mold having the desired shape, and cooling the melt below the melting point of one or more of the polymeric components.

The polymers of Formulas I to VII can be fabricated alone or as blends with one or more thermoplastic polymers. Useful thermoplastic polymers may vary widely. Illustrative of useful polymers are those formed by polymerization of α, β-unsaturated such as polypropylene, polyethylene, poly(1-octadiene), polyisobutylene, poly(1-pentene), poly(styrene), poly(2-methyl styrene), poly(4-methylstyrene), poly(1-hexene), poly(5-methyl-1-hexene), poly(4-methyl pentene), poly(butylene), poly(methylpentene-1), poly(4-methylpentene), poly(vinylcyclopentane), poly(vinylcyclohexane), poly(α-vinylnaphthalene), poly(vinylchloride), poly(vinyl flouride), poly(vinylidene fluoride), poly(vinyl alcohol), poly(acrylonitrile), poly(vinyl acetate), poly(vinylmethylether), poly(methylacrytate), poly(methylmethacrylate), acrylonitrile-butadiene-styrene copolymer, polyacrylamide, and the like. Also illustrative of useful thermoplastic polymers are polyamides and polyesters such as the copolyamides of 30% hexamethylene diammonium isophthalate and 70% hexamethylene diammonium adipate, the copolyamide of up to 30% bis(p-amidocyclohexyl)methylene, and terephthalic acid and caprolactam, poly(hexamethyleneadipamide)(nylon 66), poly(4-aminobutyric acid)(nylon 4), poly(7-aminoheptanoic acid)(nylon 7), poly(8-aminooctanoic acid)(nylon 8), poly(6-aminohexanoic acid)(nylon 6), poly(hexamethylene sebacamide)(nylon 6,10), poly(heptamethylene pimelamide)(nylon 7,7), poly(octamethylene suberamide)(nylon 8,8), poly(hexamethylene sebacamide)(nylon 6,10), poly(nonamethylene azelamide)(nylon 9,9), poly(decamethylene azelamide)(nylon 10,9), poly(decamethylene sebacamide)(nylon 10,10) poly[bis(4-aminocyclohexyl)methane-1,10-decanedicarboxamide], ((Quiana)(trans)), poly(m-xylylene adipamide), poly(p-xylylene sebacamide), poly(2,2,2-trimethylhexamethylene terephthalamide), poly(piperazine sebacamide), poly(methaphenylene isophthalamide)(Nomex), poly(p-phenylene terephthalamide)(Kevlar), poly(11-amino-undecanoic acid)(nylon 11), poly(12-aminododecanoic acid)(nylon 12), polyhexamethylene isophthalamide, polyhexamethylene terephthalamide, poly(9-aminononanoic acid)(nylon 9) polycaproamide, poly(ethylene terephthalate), poly(cyclohexylenedimethylene, terephthalate), poly(ethylene dodecate), poly(butylene terephthalate, poly[ethylene(2,7-naphthalate)], poly(methaphenylene isophthalate), poly(glycolic acid), poly(ethylene succinate), poly(ethylene adipate), poly(ethylene sebacate), poly(decamethylene azelate), poly(decamethylene azipate), poly(decamethylene sebacate) poly(dimethylpropiolactone), poly(para-hydroxybenzoate)(Ekonol), poly(ethylene oxybenzoate)(A-tell), poly(ethylene isophthalate), poly(tetramethylene terephthalate), poly(hexamethylene terephthalate), poly(decamethylene terephthalate), poly(1,4-cyclohexane dimethylene terephthalate)(trans), poly(ethylene 1,5-naphthalate), poly(ethylene 2,6-naphthalate), poly(1,4-cyclohexylidene dimethylene terephthalate)(Kodel)(cis), poly(1,4-cyclohexylidene dimethylene terephthalate)(Kodel)(trans), poly(phenyl sulfide), poly(phenylene oxide), poly(carbonates) such as poly[methane bis (4-phenyl) carbonate], and poly[2,2-propane bis(4-phenyl) carbonate].

The articles formed totally or partially from the polymers of Formulas I to VII after treatment form the polymers of Formulas VIII to XVI must be contacted with a suitable dopant either insitu or by another step to render the article conductive or semiconductive. The method for doping conjugated backbone polymers such as those of the Formulas VII to XVI and dopants for use in such methods are well known in the art (See for example U.S. Pat. Nos. 4,711,742; 4,442,187; and 4,321,114, which are hereby incorporated by reference). Accordingly, these procedures will not be discussed herein in any great detail. By way of example, a solution of the precursor polymer to poly(thienylene vinylene) of Formula I where $X_1$ is S, and D consisting of a 50;50 mixture (random) of hydroxy and pyridinium chloride groups can be prepared by dissolving the polymer in a solution such as water, or a water methanol mixture. Solvent can removed from solution forming an article composed of the neutral polymer. Thereafter, the polymer article is heated to eliminate water, pyridine and HCl to form poly(thienylene vinylene) and is then exposed to a suitable electron-acceptor dopant, as for example iodine, ferric chloride or nitrosonium salts dissolved in a solvent in which the polymer is not soluble, for a time sufficient to dope the polymer article to the desired conductivity.

Similarly, a blend of equal parts of polyethylene and a heat stable precursor polymer to poly(thienylene vinylene) of Formula I where $X_1$ is sulfur and D consists of moieties of the formula $-OR_1$ or $-SR_1$ such as nonyloxy, or butylthio groups can be formed by mixing the polymers in granulated form in a Branbury Mixer.

After sufficient mixing, the mixture is introduced into an extruder at a temperature of from about 150° C. to about 200° C. or at a temperature high enough to eliminate $R_1OH$ or $R_1SH$. The polymer melt is intruded into a mold having the desired shape of tne article and allowed to cool. Thereafter, the polymer article is exposed to a suitable electron acceptor dopant as for example iodine or ferric chloride salts in an appropriate solvent for a time sufficient to dope the polymer article to the desired extent.

The following specific examples are present to illustrate the invention and are not to be construed as limitations thereon.

EXAMPLE 1

Preparation of 2,5-Bis-(Chloromethyl)Thiophene

To a stirred solution of 37% formaldehyde (204 mL, 2.8 mole) and conc. hydrochloric acid (50 mL) was bubbled a stream of dry hydrogen chloride at 0° C. until the solution was saturated. Thiophene (70 g, 0.78 mole) was added dropwise to the solution at 0° C. for a period of 20 minutes. After addition, the mixture was stirred for another 20 minutes then washed five times with water (200 mL). The resulting mixture was refrigerated overnight then filtered by using Filter-cel to remove some paraformaldehyde.

The brownish solution was distilled under vacuum (86°–90° C./0.5 mmHg) to give a colorless liquid which solidified at room temperature. Yield (80 g, 57%) M.P. 36°–37° C. (Lit. M.P. 36°–37° C., J. M. Griffing and L. F. Salisbury, J. Amer. Chem. Soc. 3416, 70, (1948).)

EXAMPLE 2

Preparation of 2,5-Bis(Dimethylsulfonium Methyl)Thiophene Chloride

To a stirred solution of 2,5-bis(chloromethyl) thiophene (1.81 g, 0.01 mole) in dry methanol (5 mL) was added methyl sulfide (10 mL, 0.13 mole) in one portion at room temperature (under argon) and the mixture was stirred at room temperature for twenty hours.

The solvent was then evaporated under vacuum and the resulting product was washed twice with anhydrous diethylether (20 mL) and dried.

EXAMPLE 3

Preparation of 2,5-Bis(Tetrahydrothiophenonium Methyl)Thiophene Chloride

To a stirred solution of 2,5-bis(chloromethyl) thiophene (1.81 g, 0.01 mole) in a dry methanol (5 mL) was added tetrahydrothiophene (10 mL, 0.11 mole) in one portion at room temperature (under argon) and the mixture was kept stirring at room temperature for twenty hours. The material was purified by concentration, precipitation in cold acetone, filtration, followed by vacuum drying. The product was obtained as a white crystalline powder. Yield (2.86 g, 80%)

EXAMPLE 4

Preparation of the Water Soluble Polyelectrolyte Precursor to Poly(2,5-Thienylene Vinylene)

To a degassed, stirred solution of 2,5-bis(dimethylsulfonium methyl)thiophene chloride (3.05 g, 0.01 mole) in distilled water (15 mL) at 0° C. was added a cooled (0° C.) degassed solution of sodium hydroxide (0.4 g, 0.01 mole) in distilled water (10 mL).

A light orange color developed immediately and the solution became viscous. After stirring at 0° C. for 1 hour the solution was neutralized with hydrochloric acid to pH approximately 7.0 to give a solution of the desired polyelectrolyte.

EXAMPLE 5

Preparation of Poly(2,5-Thienylene Vinylene)

Part (I); The viscous solution of Example 4 was evaporated under vacuum with gentle heating (40° C. to 65° C.). The light yellow solution formed a homogeneous film coating on the flask, the color of which changed slowly from orange to red to dark purple within 2 hours. The so-formed film was rinsed with methanol, then peeled off the glass. The shiny surface of the film had a golden metal-luster; film thickness was 40 microns. The polymer had a molecular weight of approximately 100,000, i.e., about 925 repeating units.

The film was further purified by Soxhlet extraction with hot methanol overnight.

Elemental analysis; Calcd. for poly (2,5-thienylene vinylene $C_6H_4S$)=C, 66.66%; H, 3.73%; S, 29.61%. Found; C, 65.21%; H, 4.33%; S, 29.39%; Cl<0.6%

EXAMPLE 6

Preparation of a Foam-Form of Poly(2,5-Thienylene Vinylene)

The viscous solution of Example 4 was vacuum dried with rapid heating (90° C.–100° C.). Because of the rapid elimination of $Me_2S$ (methyl sulfide) and hydrochloric acid, the resulting polymer was obtained as a foam of low density (0.25 g/cm$^3$). After extracting with hot methanol, the spongy polymer had a golden luster. The polymer had a molecular weight of approximately 100,000, i.e., about 925 repeat units.

EXAMPLE 7

Preparation of 2,5-Bis-(Chloromethyl)Furan

To a stirred solution of furan-2,5-dimethanol (25 mg, 0.2 mol) and pyridine (38.4 g, 0.48 mol) in a dry chloroform (120 mL) was added dropwise a solution of thionyl chloride (52.4 g, 0.44 mol) in dry chloroform (80 mL) at −40° C. (Ar) for 1.5 h. After addition, the mixture was stirred at −40° C. for 0.5 h then warmed to 0° C. for 0.5 h. After quenching with ice water (300 mL), the organic phase was washed with 5% sodium hydroxide (10 mL), dried, then evaporated to give a light brown oil. The brownish oil was distilled under vacuum (80°–82° C., 0.5 mm Hg) to give a colorless liquid which solidified at room temperature. Yield; 24 g (75%); M.P. 27°–28° C. (M.P. 27°–28° C., K. Yu. Noritskii, V. P. Volkoo, and Yu. K. Yuiey, Zhur. Obscher. Khim., 1961, 31, 538.)

EXAMPLE 8

Preparation of 2,5-Bis(Tetrahydrothiophenonium Methyl)Furan Chloride

To a stirred solution of 2,5-bis(chloromethyl)furan (8.3 g, 0.05 mole) in dry methanol (35 mL) was added tetrahydrothiophene (25 mL, 0.28 mol) in one portion at room temperature (under Argon) and the mixture was stirred at room temperature for twenty hours. The material was purified by concentration, precipitation in cold acetone, filtration followed by vacuum drying. The product was obtained as a white crystalline powder. Yield; 15.1 g (88%).

EXAMPLE 9

Preparation of the Water Soluble Polyelectrolyte Precursor to Poly(2,5-Furylene Vinylene)

To a degassed, stirred solution of 2,5-bis(tetrahydrothiophenonium methyl) furan chloride (3.41 g. 10 mmol) in distilled water (23.3 mL) at 0° C. under argon was added a cooled (0° C.) degassed solution of sodium hydroxide (0.4 g, 10 mmol) in distilled water (10mL). A light yellow color developed immediately and the solution became viscous. After stirring at 0° C. for 1 h, the solution was membrane dialyzed against water (MWCO=3500).

EXAMPLE 10

Preparation of Poly(2,5-Furylene Vinylene)

The viscous solution of the polyelectrolyte precursor was evaporated under vacuum at room temperature until all the water was removed. At this time the purple film was heated at 65° C. for 1 h then the temperature was raised to 95° C. at a rate of 10° C. per hour. The resulting golden lusterous film was then rinsed with methanol, water, and acetone, then vacuum dried. The film was further heated in vacuum at 180° C. for 5 hours. The so-formed film was Soxhlet extracted with hot tetrahydrofuran to give poly(2,5-furylene vinylene) film of 20-40 micron thickness.

EXAMPLE 11

Thermal Conversion of Poly(1,4-Dibutoxy-2,5-Phenylendiyl-1-Butoxy-1,2-Ethylendiyl-Co-1,4-Dibutoxy-2,5-Phenylendiyl-1-(Pyridinium Chloride)-1,2-Ethylendiyl) into the Conjugated Polymer Poly(1-4-Dibutoxy-2,5-Phenylendiyl-1,2-Ethenylene) (X, $R_{10}=R_{11}$=Butoxy, $R_5=R_6$=H, n=p=0)

The yellow-orange cast film from Example 2 was placed between two sheets of Teflon film and heated in an inert atmosphere at 300° C. for 30 minutes. The yellow-orange film changed to deep red after thermal treatment indicating that an extensively conjugated polymer was formed. This eliminated, conjugated polymer remained highly soluble in common organic solvents such as toluene, chloroform, methylene chloride, tetrahydrofuran,-and the like.

EXAMPLE 12

Chemically Induced Conversion of Poly(1,4-Dibutoxy-2,5-Phenylendiyl-1-Butoxy-1,2-Ethylendiyl) to the Conjugated Polymer (1,4-Dibutoxy-2,5-Phenylendiyl-1,2-Ethendiyl)

To a solution of the precursor polymer poly(1,4-dibutoxy-2,5-phenylendiyl-1-butoxy-1,2-ethylendiyl) in chloroform was added 1.0 eq. of acetic anhydride with a trace of acetic acid (as catalyst). Upon addition of the anhydride, the yellow-orange polymer solution immediately turned deep red indicating the elimination of butanol occured to give the highly conjugated polymer poly(1,4-dibutoxy-2,5-phenylendiyl-1,2-ethenylene) which remained in solution. Other chemical agents which induce elimination are trifluoroacetic anhydride, chlorotrimethylsilane, acetyl chloride, methane sulfonyl chloride, phthalic anhydride, and the like, with a trace amount of corresponding acid added as a catalyst.

EXAMPLE 13

Doping of Poly(1,4-Dibutoxy-2,5-Phenylendiyl-1,2-Ethenylene to Give Highly Conductive Polymer On exposure to iodine vapor (room temperature, 30 minutes) the dark red polymer films obtained by thermal elimination (Example 3) turned deep blue and attained a conductivity of 1 ohm$^{-1}$cm$^{-1}$ (four-point in-line probe). Chemically eliminated films (Example 12) on exposure to iodine vapor reached conductivities of 14 ohm$^{-1}$cm$^{-1}$.

EXAMPLE 14

Amine Stabilization of Polyelectrolyte Precursor Polymer Solution

To determine the efficacy of various amines to stabilize solutions of the polyelectrolyte precursor polymers of the Formulas VVII to XXVIII in water, a solution of freshly prepared poly(2,5-dimethoxy-1,4-phenylendiyl-1-dimethylsulfonium chloride)-1,2-ethylendiyl) (XXVI, n=0, p=0, $R_5=R_6$=H, $R_{11}=R_{12}$=OCH$_3$, $R_{13}=R_{14}$=CH$_3$, Z$^-$=Cl$^-$) was divided into thirteen separate fractions. To each of twelve was added an organic amine of different structure; the thirteenth was used as a control (no additive). All were kept at room temperature. The following table lists times to gel formation for each sample.

| | Efficacy of Amines to Stabilize Polyelectrolyte Aqueous Solution Against Gel Formation | |
|---|---|---|
| Sample | Amine Added | Observation |
| 1 | Pyridine | No gel formation after 9 mos. |
| 2 | Pyridine (lower concentrations) | No gel formation after 9 mos. |
| 3 | trimethylamine | No gel formation after 9 mos., slight yellow color. |
| 4 | trimethylamine | Yellow precipitate after 7 days |
| 5 | N—methylpiperidine | Yellow precipitate after 7 days |
| 6 | N—methylpyrrolidine | Yellow precipitate after 7 days |
| 7 | quinoxaline | Gel formed after 3 days |
| 7 | quinoxaline | Gel formed after 3 days |
| 8 | quinoline | Gel formed after 3 days |
| 9 | isoquinoline | Gel formed after 3 days |
| 10 | 2-bromopyridine | Gel formed after 3 days |
| 11 | 2,3-cyclopentenopyridine | Gel formed after 3 days |
| 12 | 2,3,cyclohexenopyridine | Gel formed after 3 days |
| 13 | None | Gel formed within 3 days |

EXAMPLE 15

Preparation of a Stabilized Polyelectrolyte Aqueous Solution of the Precursor Polymer to VIII ($X_1$=S, $R_1=R_2=R_5=R_6$=H)

To a degassed stirred solution of 2,5-bis(tetrahydrothiophenonium methyl) thiophene chloride (3.57 g, 0.01 mole) in distilled water (15 ml) at 0° C. (Ar) was added a cooled (0° C.) degassed solution of sodium hydroxide (0.4 g, 0.01 mole) in distilled water (10 ml) under Argon. A light orange color developed immediately and the solution became viscous. After stirring at 0° C. for 30 minutes, the solution was diluted with a solution of pyridine (2 ml) in distilled water (75 ml) and then dialyzed against a solution of ice-water (1500 ml) and pyridine (50 ml) with Spectra/por membrane tubing (MNCO=3500) to remove the low molecular weight reactants and products.

After 4 days, the light brown solution was evaporated in a flat-bottomed dish to get a tough, flexible, free-standing film with a thickness of 30μ.

400 MHz $^1$H NMR showed that the precursor polymer contained a 1;1 ratio of pyridinum and hydroxy functional groups. (III, $X_1=X_2=S$, p=0, n=o=1, $R_1=R_2=R_3=R_4=R_5=R_6=H$, D=OH, D'=pyridinum chloride).

Such cast films could be redissolved in water at room temperature to give solutions of the new polyelectrolyte which remained stable indefinitely.

In the absence of added pyridine, the precursor polymer precipitates from solution within one hour at 10° C.

EXAMPLE 16

Preparation of Poly(2,5-Thienylene Vinylene) From a Stabilized Form of Precursor Polymer The free-standing film of the precursor polymer from Example 15 was clamped between two pieces of teflon in an aluminum elimination cell and then heated in a vacuum chamber at 300° C. for two hours. The resulting golden lustrous film was very flexible and had excellent mechanical properties. SEM showed these films to be completely space filled.

EXAMPLE 17

Preparation of Iodine Doped Poly(2,5-Thienylene Vinylene

A piece of poly(2,5-thienylene vinylene) as prepared in Example 16 with a thickness of 30 microns was doped with iodine vapor at room temperature for 3 hours. The conductivity of the doped film was found to be 325 ohm$^{-1}$cm$^{-1}$ (4-in-line probe).

EXAMPLE 18

Preparation of FeCl$_3$ (Ferric Chloride) Doped Poly(2,5-Thienylene Vinylene)

To a solution of FeCl$_3$ (30 mg) in nitromethane (10 ml) was added at 0° C. a film of poly(2,5-thienylene vinylene) prepared as in Example 16 having a thickness of 30 microns. After seven hours, the doped film was rinsed with nitromethane and toluene, then dried under vacuum. The conductivity of the doped film was found to be 105 ohm$^{-1}$cm$^{-1}$ (4-in-line probe).

EXAMPLE 19

Preparation of an Organic-solvent Soluble Thermally Stable Precursor Polymer to Poly(2,5-Thienylene Vinylene)

To a degassed, stirred solution of 2.5-bis(tetrahydrothiophenonium methyl) thiophene chloride (3.57 g, 0.01 mole) in dry methanol (15 ml) at −40° C. (Ar) was added a degassed solution of sodium hydroxide (0.4 g, 0.01 mole) in methanol (10 ml).

After stirring at −40° C. for 30 minutes, the solution was diluted with chilled methanol (75 ml) then dialyzed against methanol (1500 ml) with "Spectropor" membrane tubing (MWCO=6500) to remove the low molecular weight reactants and products.

After 1 day, the pale yellow precipitate was filtered off, dried, then redissolved in tetrahydrofuran. The solution was evaporated at room temperature in a flat-bottomed dish to get a tough, very elastic film with a thickness of around 20 microns.

400 MHz $^1$H NMR showed that the sulfonium groups in the precursor polymer has been completely replaced with methoxy substituents. (I, D=OCH$_3$, $R_1=R_2=R_5=R_6=H$, $X_1=S$).

These cast films were very soluble and stable to elimination in common organic solvents such as THF, methylene chloride, chloroform, toluene, acetone, nitromethane, DMF, and the like.

EXAMPLE 20

Preparation of Poly(2,5-Thienylene Vinylene) From an Organic Solvent-soluble Precursor Polymer The gummy elastic film of the precursor polymer prepared in Example 19 was clamped between two pieces of teflon in an aluminum elimination cell and then heated in a vacuum chamber at 300° C. for two hours. The resulting golden lusterous film was very flexible. UV and Infrared spectra showed this material to be essentially identical to that of poly(2,5-thienylene vinylene) prepared as in Example 16.

EXAMPLE 21

Preparation of Iodine-doped Poly(2,5-Thienylene Vinylene)

A piece of poly(2,5-thienylene vinylene) film as prepared in Example 20 was treated with iodine vapor at room temperature for 3 hours. After removing excess iodine (vacuum, room temperature, 1 hr.), the conductivity of the doped film was found to be 300 ohm$^{-1}$cm$^{-1}$ (4-in-line probe).

What is claimed is;

1. A homopolymer, or random or block copolymer having regular or random recurring units of the following Formulas I-VII;

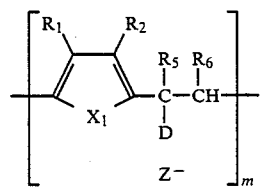

I

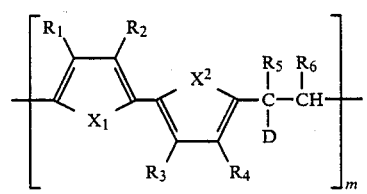

II

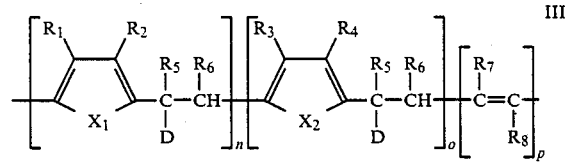

III

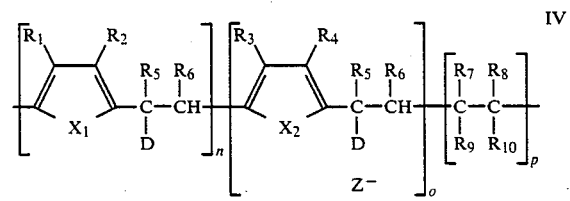

IV

-continued

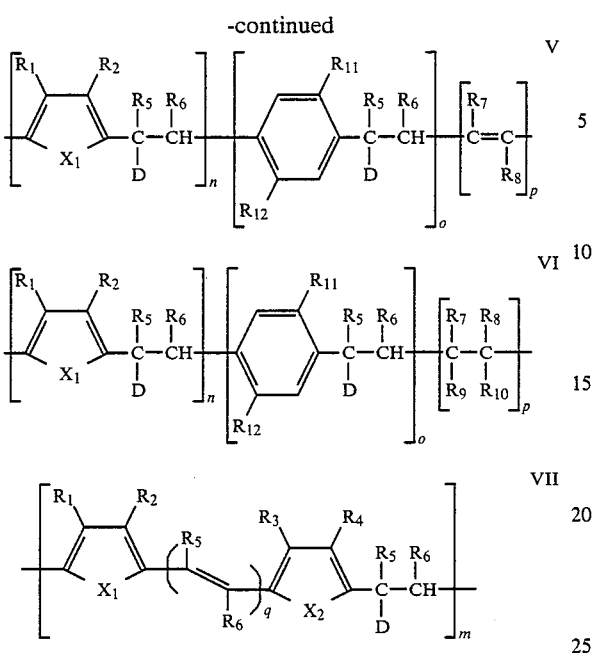

wherein;
m, n, o, and p are the same or different and are integers, and are selected such that m or the sum of n, o and p is greater than about 100; with the proviso that at least one of n or o is not zero;
q is an integer from 0 to about 4;
D is a leaving group selected from the group consisting of halogens, pseudohalogens, or moieties of the formula: $-OR_1$, $-SC(O)OR_1$, $-SC(S)OR_1$, $-SOR_1$, $-SR_1$, $-OSOR_1$, $-SC(S)OR_2$, $-SOR_1$, $-SR_1$, $-OSOR_1$, $-OOR_1$, $-OSO_3R_1$, $-N^+R_1R_2R_3.Z^-$, $-P^+R_1R_2R_3.Z^-$, $-SeR_1$, $-P(OR_1)_2$, $-SiR_1R_2R_3$, $-S^+OR_1R_2.Z^-$, $-{}^+NOR_1R_2.Z^-$, $-PO(OR_1(OR_2)$, or $-SO_3{}^-M_+$;

$R_1$, $R_2$, $R_3$, $R_4$, $R_5$, $R_6$, $R_7$, $R_8$, $R_9$, $R_{10}$, $R_{11}$, $R_{12}$, are the same or different at each occurrence and are hydrogen or isotopes thereof, alkyl, alkenyl, aryl, alkoxy, cycloalkyl, cycloalkenyl, alkanoyl, alkylthio, aryloxy, alkylsulfinyl, alkoxyalkyl, alkylsulfonyl, arylamino, diarylamino, alkylamino, dialkylamino, alkylarylamino, arylthio, heteroaryl, arylsulfinyl, alkoxycarbonyl, arylsulfonyl, carboxylic acid, halogen, nitro, cyano, sulfonic acid, or alkyl or phenyl substituted with one or more of sulfonic acid, phosphoric acid, carboxylic acid, halo, amino, nitro, cyano or epoxy moieties, or a moiety of the formula:

$$-(OR_{13})_r-OR_{14} \text{ or } -R_{13}-(OR_{13})_r-OR_{14}$$

wherein;
$R_{13}$ is a divalent alkylene moiety having from 1 to about 7 carbon atoms;
$R_{14}$ is alkyl having from 1 to about 7 carbon atoms; and
r is a natural number from 1 to about 50; or any of $R_1$ and $R_2$, or $R_3$ and $R_4$, or $R_5$ and $R_6$, or $R_7$ and $R_8$, or $R_9$ and $R_{10}$ or $R_{11}$ and $R_{12}$ or $R_{13}$ and $R_{14}$ or $R_{15}$ and $R_{16}$ substituents taken together are an alkylene or alkenylene group completing a 3, 4, 5, 6 or 7 membered aromatic or alicyclic carbon ring, which ring may optionally include one or more divalent heteroatoms of nitrogen, sulfur, sulfinyl, sulfonyl or oxygen; and $X_1$ and $X_2$ are the same or different and are S, O, Se, $NR_{15}$, or $PR_{15}$, wherein $R_{15}$ is hydrogen, $R_1$, alkylaryl, arylalkyl, alkyl or aryl.

2. A polymer according to claim 1 wherein;
$R_1$ to $R_4$ are the same or different at each occurence and are hydrogen; alkyl containing from 1 to about 20 carbon atoms; phenyl; alkenyl containing from 2 to about 20 carbon atoms; alkylphenyl or phenylalkyl each containing from about 7 to about 20 carbons atoms; alkylthio or alkoxy each containing from 1 to about 20 carbon atoms; alkylamino, dialkylamino, diarylamino, arylamino and alkylarylamino; alkoxyalkyl having from 2 to about 20 carbon atoms; substituted phenyl or substituted alkyl having from 1 to about 20 carbon atoms wherein permissible substitutents are epoxy, nitro, cyano, amino, sulfonic acid, phosphoric acid, carboxylic acid or halo groups; moiety of the formula:

$$-(OR_{13})_r-OR_{14}, \text{ or } -R_{13}-(OR_{13})_r-OR_{14}$$

wherein;
$R_{13}$ is alkyl having from 1 to about 4 carbon atoms;
$R_{14}$ alkyl having from 1 to about 4 carbon atoms; and
r is a natural number from 1 to about 25; or any of $R_1$ and $R_2$, or $R_3$ and $R_4$ substituents taken together may form an alkylene or alkenylene chain having from 2 to 20 carbon atoms completing a 4, 5 or 6 membered ring system which may include one or more heteroatoms of divalent oxygen or sulfur.

3. A polymer according to claim 2 wherein;
$R_1$, $R_2$, $R_3$, and $R_4$ are the same or different at each occurrence and are hydrogen, alkoxyalkyl, alkoxy, alkythio, alkyl, or moieties of the formula:

$$-(OR_{13})_r-OR_{14} \text{ or } -R_{13}-(OR_{13})_r-OR_{14}$$

wherein:
$R_{13}$ is alkylene of about 2 to about 3 carbon atoms;
$R_{14}$ is alkyl of from 1 to about 3 carbon atoms; and
r is a natural number from 1 to about 10.

4. A polymer according to claim 3 wherein $R_1$, $R_2$, $R_3$ and $R_4$ are hydrogen.

5. A polymer according to claim 3 wherein $R_1$, $R_2$, $R_3$ and $R_4$ are the same or different at each occurrence and are hydrogen, alkyl, alkoxy, alkoxyalkyl or a moiety of the formula:

$$-(OR_{13})_r-OR_{14} \text{ or } -R_{13}-(OR_{13})_r-OR_{14}$$

wherein;
$R_{13}$ is alkylene of about 2 to about 3 carbon atoms;
$R_{14}$ is alkyl of from 1 to about 3 carbon atoms; and
r is a natural number from 1 to about 10.

6. A polymer according to claim 3 wherein no more than about two of $R_1$, $R_2$, $R_3$ or $R_4$ is alkyl, alkoxy, alkoxyalkyl or a moiety of the formula:

$$-(OR_{13})_r-OR_{14}; -R_{13}(OR_{13})_r-OR_{14};$$

the remainder being hydrogen wherein;
$R_{13}$ is alkylene of about 2 to 3 carbon atoms;
$R_{14}$ is alkyl of from 1 to about 3 carbon atoms; and
r is a natural number from 1 to about 10.

7. A polymer according to claim 3 wherein $R_1$ is alkoxy or alkyl having from 1 to about 12 carbon atoms, alkoxyalkyl having from 2 to about 12 carbon atoms or a moiety of the formula:

$$-(OR_{13})_r-OR_{14}; \text{ or } -R_{13}-(OR_{13})_r-OR_{14};$$

wherein;
$R_{13}$ is $-(CH_2)_2-$ or $-CH_2CH(CH_3)-$;
$R_{14}$ is $-CH_3$ or $-CH_2CH_3$; and
r is a natural number from 1 to about 6;
$R_3$ is hydrogen or alkyl having from 1 to about 12 carbon atoms; and
$R_2$ and $R_4$ are hydrogen.

8. A polymer according to claim 7 wherein;
$R_1$ is alkyl and;
$R_3$ is alkyl having from 1 to about 12 carbon atoms.

9. A polymer according to claim 1 wherein $R_5$ to $R_{12}$ are the same or different at each occurrence and are hydrogen, substituted or unsubstituted alkyl having from 1 to about 12 carbon atoms, substituted or unsubstituted phenyl, or alkylthio or alkoxy ach having from 1 to about 12 carbon atoms; or any of $R_5$ and $R_6$, or $R_7$ and $R_8$, or $R_9$ and $R_{10}$, or $R_{11}$ and $R_{12}$ substituents taken together may form an alkylene chain having 2 to about 20 carbon atoms completing a 4, 5 or 6 membered ring system which may include one or more heteroatoms of oxygen, nitrogen or sulfur.

10. A polymer according to claim 9 wherein $R_5$ to $R_{12}$ are the same or different at each occurrence and are hydrogen or alkyl having from 1 to about 12 carbon atoms.

11. A polymer according to claim 1 wherein at least one of $R_5$ to $R_{12}$ is hydrogen.

12. A polymer according to claim 1 wherein $X_1$ and $X_2$ are sulfur.

13. A polymer of claim 1 wherein $X_1$ and $X_2$ are $NR_{15}$.

14. A polymer according to claim 13 wherein $R_{15}$ is hydrogen or alkyl from about 1 to about 12 carbon atoms.

15. A polymer according to claim 1 wherein m or the sum of n, o, and p are the same or different and are equal to or greater than about 200 with the proviso that at least one of o or n is not zero.

16. A polymer according to claim 15 wherein m, or the sum of n, o, and p are the same or different and are equal to or greater than about 500.

17. A polymer accrding to claim 1 wherein D is a halogen, a psuedohalogen, or a moiety of the formula:
$-OR_1$, $-SC(O)OR_1$, $-SC(S)OR_1$, $-SOR_1$, $-SR_1$, $-OSOR_1$, $-SC(S)OR_2$, $-SOR_1$, $-SR_1$, $-O-SOR_1$, $-OOR_1$, $-OSO_3R_1$, $-N^+R_1R_2R_3.Z^-$, $-P^+R_1R_2R_3.Z^-$, $-SeR_1$, $-P(OR_1)_2$, $-SiR_1R_2R_3$, $-S^+OR_1R_2.Z^-$, $-^{30}NOR_1R_2.Z^-$, $-PO(OR_1(OR_2)$, and $-SO_3^-M_+$;

Z is an anion; and
$R_1$, $R_2$ and $R_3$ are the same or different and are hydrogen, or substituted or unsubstituted alkoxyalkyl, aryl, alkanoyl, alkoxyaryl, aroyl, arylsulfonyl, alkanesulfonyl or arylalkyl wherein permissible substituents are one or more carboxylic acid groups, sulfonic acid groups, alkyl, alkoxy, carboxylic acid salts or sulfonic acid salts.

18. A polymer according to claim 1 wherein D is a moiety selected from the group consisting of;
(a) $-OR_1$, $-^+PR_1R_2R_3.Z^-$, $-SR_1$, $-^+NR_1R_2R_3.Z^-$, $-SiR_1R_2R_3$, $-S^+OR_1R_2.Z^-$, $-^+NOR_1R_2.Z$, wherein
$R_1$, $R_2$ and $R_3$ are the same or different and are alkyl, phenyl, phenylalkyl, phenyl substituted with one or more alkyl or alkoxy groups, or two or more of $R_1$, $R_2$ and $R_3$ together may form an alkylene or alkenylene chain containing two or more double bonds completing an alicyclic, aromatic or heterocyclic ring structure; and
(b) halogen; and
(c) psuedohalogen.

19. A polymer according to claim 18 wherein D is selected from the group consisting of;
halogens, pseudohalogens and moieties of the formula:

$$-OR_1, -N^+R_1R_2R_3.Z^- \text{ and } -SR_1.$$

20. A polymer according to claim 19 wherein D is a moiety of the formula $-N^+R_1R_2R_3.Z^-$.

21. A polymer solution comprising
(a) a solvent selected from the group consisting of water, an organic solvent and mixtures thereof; and
(b) one or more polymers according to claim 1.

22. A method of forming an article which comprises the steps of;
(a) forming the solution of claim 21; and
(b) removing the solvent from the solution as the polymer solute solidifies to form the solidified polymer having the shape of said article.

23. An article manufactured by the method of claim 22.

24. A polymeric blend comprising one or more polymers of claim 1 and one or more thermoplastic polymers.

* * * * *

UNITED STATES PATENT AND TRADEMARK OFFICE
CERTIFICATE OF CORRECTION

PATENT NO. : 4,900,782
DATED : February 13, 1990
INVENTOR(S) : Chien-Chung Han et al.

It is certified that error appears in the above-identified patent and that said Letters Patent is hereby corrected as shown below:

Col. 34, line 3, "$^{-30}NOR_1R_2.Z^-$" should read --$^{-+}NOR_1R_2.Z^-$--.

Signed and Sealed this

Nineteenth Day of March, 1991

Attest:

HARRY F. MANBECK, JR.

*Attesting Officer*  *Commissioner of Patents and Trademarks*